(12) United States Patent
Wright

(10) Patent No.: US 7,842,913 B2
(45) Date of Patent: Nov. 30, 2010

(54) METHOD FOR DETERMINING THE POSITION OF A FIRST MOVING COMPONENT RELATIVE TO A SECOND COMPONENT AND DEVICE FOR APPLYING SAID METHOD

(75) Inventor: C. David Wright, Canfield, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 12/315,705

(22) Filed: Dec. 5, 2008

(65) Prior Publication Data

US 2009/0147271 A1     Jun. 11, 2009

(51) Int. Cl.
G01B 11/14  (2006.01)
G01D 5/34   (2006.01)

(52) U.S. Cl. .............................. 250/231.13; 250/231.11; 250/227.11; 356/620; 356/617

(58) Field of Classification Search .................. 356/614, 356/617, 620, 402–408; 250/231.13, 231.11, 250/231.14, 227.11, 237 G
See application file for complete search history.

(56) References Cited

U.S. PATENT DOCUMENTS 5,066,130 A * 11/1991 Tsukiji et al. ............... 356/494
5,965,879 A * 10/1999 Leviton .................. 250/231.13
5,973,320 A * 10/1999 Maruyama et al. ...... 250/231.13
6,963,063 B2 * 11/2005 Johnson .................. 250/231.13
7,112,781 B2 * 9/2006 Ch'ng et al. ............ 250/231.13
7,126,109 B2 * 10/2006 Goldman et al. ........ 250/231.14
7,462,815 B2 * 12/2008 Chua et al. .............. 250/231.13
7,538,312 B2 * 5/2009 Tupinier et al. ......... 250/231.11

FOREIGN PATENT DOCUMENTS

EP           512864 A1 * 11/1992
EP           729013 A2 * 8/1996

* cited by examiner

Primary Examiner—Sang Nguyen
(74) Attorney, Agent, or Firm—Jimmy L. Funke

(57) ABSTRACT

A method for determining the position of one of two components in relative motion with respect to each other, using optical means, comprises:
  directing at least one light beam emitted by a light source attached to one component towards a diffractive support attached to the second component, calculated and manufactured for generating an optical signal indicative of the positioning of said support, the optical signal being produced by the diffractive support in transmission and/or in reflection, and the optical signal including information indicative of its quality;
  detecting and reading at least one optical code formed by said signal, which corresponds to a unique position of the diffractive support relatively to the beam; and
  assigning a position to each detected optical code.

18 Claims, 18 Drawing Sheets

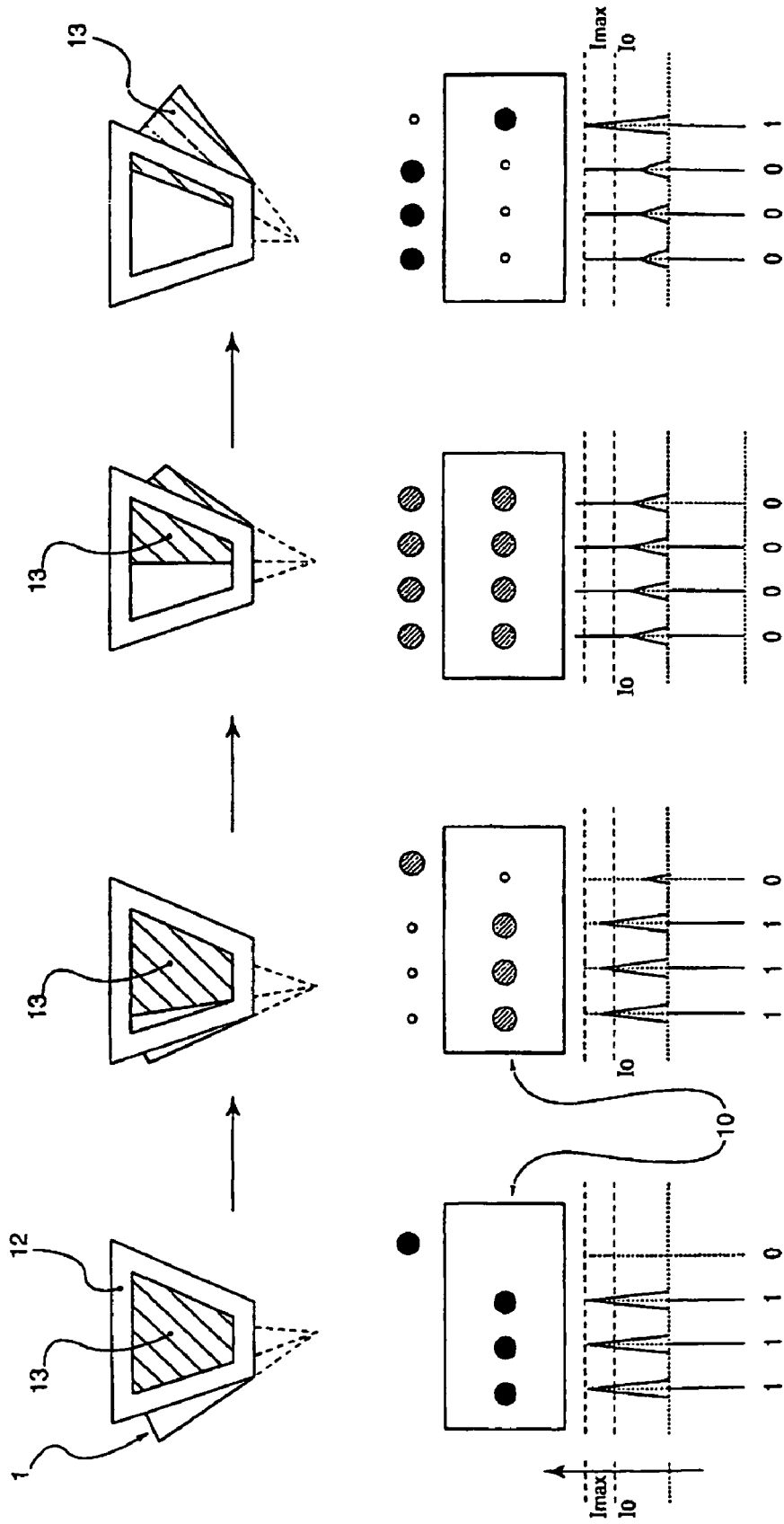

METHOD FOR DETERMINING THE POSITION OF A FIRST MOVING COMPONENT RELATIVE TO A SECOND COMPONENT AND DEVICE FOR APPLYING SAID METHOD

TECHNICAL FIELD

The present invention relates to the general technical field of systems or devices allowing a relative movement between two components to be determined and measured, for example a displacement between a mobile part and a fixed part.

BACKGROUND OF THE INVENTION

In an increasing number of technical applications, it has become important to be able to accurately give the position of a mobile component relatively to a fixed mark for example, occasionally at a high frequency. Such is the case for example in a vehicle steering column or in machine tools performing complex machining operations, or even, again in the automotive field, for flaps of air-conditioning systems. The possible applications are countless and explain the exponential development of positioning sensors, in particular linear or angular sensors.

In fact, one of the driving factors influencing the demand for sensors having improved resolution is the anticipated development of electronically controlled steering systems, in which systems, safety is critical. In such systems, sensors must perform with extremely high reliability, often requiring redundancy in many forms. In these systems, the effect of an error in reported position can be dangerous, and the sensor must be able to self-diagnose when an error has occurred.

Several technologies may be used for detecting and measuring relative positions, the sensors which stem from the latter being, in most cases, associated with complex electronic processing means using interpolation algorithms which allow the position to be calculated.

Devices for locating a position relatively to a fixed mark, are thus already known, based on optical technologies, which however require, under nearly all assumptions, complex electronic processing of very basic optical information.

SUMMARY OF THE INVENTION

The aforementioned goals, and other advantages, are achieved by the present invention, which relates to a method for determining the position of one of two moving components relatively to each other, consisting of:

directing at least one light beam emitted by a light source attached to one component, towards a diffractive support attached to the second component, wherein the support is calculated and manufactured in order to generate a diffracted optical signal indicative of the positioning of said support, wherein the optical signal is produced by the diffractive support in transmission and/or in reflection, and wherein the optical signal includes information indicative of its quality;

detecting and reading at least one optical code formed by said signal, which corresponds to a unique position of the diffractive support relatively to the beam and which code includes information indicative of the quality of the signal;

assessing the quality of the signal; and assigning a position to each detected optical code.

The originality of this method, based on phase and/or amplitude modulation of the incident signal, lies in the fact that the coding is achieved by optical means, which notably provides simplification of electronic processing. The relative positions of the moving components may simply be coded in an absolute way. This invention proposes to include a level of redundancy in the encoding of the information on the disk itself, in the form of error detecting (parity) or error detecting & correcting (cyclic redundancy check) codes that are embedded with the position information. Thus, an error detecting code would facilitate an assessment of signal quality or reliability, and if desired, detection and/or correction of errors that could occur at one or more points in the system.

Diffractive optical coding further has advantages which are also expressed in the devices for applying the method, and which will be mentioned in more detail in the following text.

According to an exemplary embodiment of the method, the optical signal may be defined by the first diffraction order, the complementary signals in the same diffraction order being however retained in order to maintain the intensities of the detected light spots substantially constant. Interpretation errors are thereby avoided, related to a non-constant intensity of the spots to be detected and to be analyzed. Uniformization of the diffracted energy resulting from this facilitates the reading of the position which consequently is more reliable. A portion of the diffractive portion is read, and the complementary portion in the same diffraction order is not read, but used for counter-balancing the excess energy in order to uniformize the intensity.

According to an alternative, the conjugate order corresponding to the first diffraction order, may however also be read and compared with the latter. With this, it is possible to carry out a check of the optical code obtained by reading the first diffraction order, as there is redundancy between both pieces of information.

Other diffraction orders may however be used, for specifying, completing or checking the read-out of the optical signals.

In an exemplary embodiment, the information that is indicative of the quality of the signal may include error detecting and correcting codes such as parity codes, information facilitating checksum operations, and information facilitating polynomial redundancy checks. For example, parity (even or odd) codes enable the counting of the quantity of "ones" in a word, and a parity code is indicative of whether there are an even or odd number of "ones." In an embodiment utilizing a parity code as an indication of quality, the receiving system may count the number of ones and compare the resulting count to the parity bit. In such a system, a disagreement may indicate an error and thus the system may assess the signal as unreliable (i.e., exhibiting poor quality). It should be noted that this method can detect single-bit errors and some multiple bit errors, but may be unable to correct the signal or otherwise improve its quality without additional means for doing so.

The information that is indicative of the quality of the signal may also include information facilitating checksum operations. Checksums can be used on groups of data words wherein the sum of the data words is calculated and stored with the data. In such systems, the receiving system calculates the same checksum and compares it with the received checksum. In such a system, a disagreement may indicate an error and thus the system may assess the signal as unreliable (i.e., exhibiting poor quality).

The information that is indicative of the quality of the signal may also include information facilitating cyclic redundancy checks using polynomials. In such systems, complex polynomials may be utilized that can not only detect, but in some cases correct, single- or multiple-bit errors.

Preferably, the position corresponding to the last detection is stored. If need be, this allows anomalous movements to be detected, for example occurring during failure or deterioration of a mechanical part involved in the movement or in the determination of the position.

The optical code formed by each optical signal in the case in point appears as optical structures, on the base of which bits 0 and 1 of an electronic code are generated by means for detecting and reading said structures. Such an optical signal is extremely interesting as it is insensitive to vibrations, offsets (for example, it is translationally invariant with a Fourier diffractive support).

According to an alternative in which the codes are not distinguished per sectors according to the positions of the mobile component, but they change rather continuously, each detected and read signal is submitted to an algorithm for calculating the position of the diffractive support relatively to the beam. Of course, the algorithm changes according to the relative displacement velocity.

In the method of the invention, according to another alternative, each detected and read optical code is compared with electronic codes stored in a memory table and which allow the position of the diffractive support to be determined on a one-to-one basis. Each code in fact corresponds to a unique position. It then needs to be identified, i.e., each code needs to be delimited in practice.

For this purpose, the diffractive optical code may include at least one starting optical structure and at least one end optical structure delimiting the read-out area of the optical signal corresponding to a determined position of the diffractive support relatively to the beam.

According to an additional possibility, each optical code corresponding to a position of the diffractive support may include at least one optical synchronization structure, the detection of which allows the triggering of the read-out phase for the optical signal integrating the code of a position of the diffractive support relatively to the beam. This phase is then only carried out when the delimitation of the code is confirmed by the optical synchronization signal.

In an exemplary embodiment, a method includes the step of assessing the quality of the optical signal and/or of the position information interpreted from the optical signal. In another exemplary embodiment, a method includes the further step of correcting the position information to create a position signal having improved reliability.

In an exemplary embodiment, a system employing the described method includes means for assessing the quality of the optical signal and/or of the position information interpreted from the optical signal. In another exemplary embodiment, a system employing the described method includes means for correcting the position information to create a position signal having improved reliability.

For the aforementioned alternatives, each optical code corresponding to an identifiable position may finally include at least one optical calibration structure used for the purpose of diagnosing proper read-out operation.

Said optical structures in fact consist of at least one light spot, the intensity of which may be measured. In the case of operational failure of the components of the system, or appearance of conditions (condensation, . . . ) causing uncertain operation, the analysis of these optical structures and of the signal which they form, allows the system to conclude as to whether an adequate read-out is possible or not.

It should be noted that the light spot forming the optical structure may assume different, more or less complex shapes.

According to one possibility, the codes defining the position of a component relatively to the other comply, in the order of their succession, with the GRAY code. The change of a single light spot at a known location therefore provides considerable simplification of the positioning analysis.

The changes in intensity of at least one of the optical structures forming the optical signals may further be coded by an analog/digital converter, authorizing a binary or grey-level read-out with which the resolution of the measurement may be further refined.

In the case of sectorized coding, which corresponds to the first aforementioned alternative, the light source may be pulsed according to a frequency controlled by the velocity of the moving component, the read-out being then synchronized with the generation of the light beam(s). With this, if need be, the use of an optical synchronization signal may be omitted.

The method reported above may be applied to any type of relative motion, and notably to relative rotation of two components. Under this assumption, it consists of determining the angular position of one of the components relatively to the other.

The accuracy of the measurement depends on dimensional, manufacturing considerations, and also obviously on the desired definition for the signal: according to one possibility, the number of optical spots or structures used for coding the angular position, is at least equal to 12 to provide an angular resolution less than 0.1° and an accuracy of the same order of magnitude. The 4,096 possibilities provided by 12 bits actually allow a resolution of this order.

The object of the present invention is also achieved by a diffractive support including mounting means on a first component in relative motion with respect to a second component, and provided with at least one diffractive track, either continuous or not, said diffraction track having means for diffracting by reflection and/or by transmission, the light beam emitted by at least one light source, fixed with respect to the second component.

The diffraction of the light rays may be obtained via different routes.

Thus, the diffractive track may for example have an etched relief in the constituent material of the diffractive support, capable of diffracting the incident beam(s) and of generating an optical signal, the reading of which allows the position of the first component relatively to the second component to be identified, by identifying the code formed by the signal.

According to a second exemplary embodiment, the diffractive track may be obtained by modulating the transparence of the support, for example by applying an opaque material onto certain locations on a transparent support, to obtain the same result.

The diffractive track may also be obtained by modulating the refractive index or even by a combining the mentioned solutions.

For example, modulation of the reliefs or of the opaque material, the geometry and the distribution of which are calculated by a computer, generates a particular diffracted optical signal under the action of at least one light beam, said signal forming an optical code consisting of optical structures defining a unique position of the support at any time.

The diffractive support may thus be made with known materials, with large reproducibility and without altering the accuracy and/or the resolution of the determination of each position. Large importance is attached to the selection of these materials, which preferably should be inexpensive and easy to machine. For example, they may be polycarbonate, PMMA, and more generally all optically adequate materials.

According to an exemplary embodiment corresponding to one of the aforementioned alternatives, each track is divided into areas with an individualized diffractive structure generating a code corresponding to a unique position of the support, each area including a plurality of elementary shapes with a parallelogrammic aspect, positioned as a periodic or aperiodic grid.

In a rotary configuration, the diffractive support may for example include:

a rigid disk;
means for mounting to a rotary shaft;
at least one ring-shaped diffractive track.

As an example, the disk may include three diffractive tracks, the first one being used for defining the optical code, the second one being used for defining a synchronization signal and the third one being used for defining a calibration signal.

Under the assumption of the first alternative with sectorized domains, as mentioned above, each track is then divided into angular sectors with equal surfaces, delimiting said individualized diffractive structures.

According to an exemplary embodiment observing the requirements for reduced bulkiness, the angular sectors may have dimensions of the order of 10 µm to 100 µm. The dimensions of the disk are then provided so that each track comprises at least 3,600 angular sectors, so as to meet the requirement of a resolution less than 0.1°.

By meeting these assumptions, it is possible to build a support, the radius of which does not exceed a few tens of millimeters.

The disk is not necessarily flat, and it may include, on its periphery, a tapered portion, one of the tilted surfaces of which includes at least one diffractive track. With such a tilted surface, it is possible for example, to optimize the positioning and/or the orientation of the light source and of the detection means.

According to another exemplary embodiment, very flexible to use, the diffractive track may be positioned on a cylindrical surface, for example the rotary shaft of a steering column. Bonding of a diffractive track thereon, the support of which is flexible, may then be contemplated.

The object of the present invention is also achieved by a device for measuring the position of a first component in relative motion with respect to a second component and including:

at least one fixed light source, emitting at least one light beam on at least one mobile diffractive support;
means for detecting and reading an optical signal obtained by diffraction of the light beam(s) by transmission or reflection from the diffractive support(s), said optical signal including information indicative of its quality;
and means for processing the optical code resulting from the detected signal with which the position of the diffractive support(s) and quality or reliability of the position information may be determined relatively to the beam(s);
means for assessing the quality of the optical signal and/or the position information; and
means for optionally correcting the position information to produce position information having improved quality and/or reliability.

In an exemplary embodiment, the information that is indicative of the quality of the signal may include error detecting and correcting codes such as parity codes, information facilitating checksum operations, and information facilitating polynomial redundancy checks. For example, parity (even or odd) codes enable the counting of the quantity of "ones" in a word, and a parity code is indicative of whether there are an even or odd number of "ones." In an embodiment utilizing a parity code as an indication of quality, the receiving system may count the number of ones and compare the resulting count to the parity bit. In such a system, a disagreement may indicate an error and thus the system may assess the signal as unreliable (i.e., exhibiting poor quality). It should be noted that this method can detect single-bit errors and some multiple bit errors, but may be unable to correct the signal or otherwise improve its quality without additional means for doing so.

The information that is indicative of the quality of the signal may also include information facilitating checksum operations. Checksums can be used on groups of data words wherein the sum of the data words is calculated and stored with the data. In such systems, the receiving system calculates the same checksum and compares it with the received checksum. In such a system, a disagreement may indicate an error and thus the system may assess the signal as unreliable (i.e., exhibiting poor quality).

The information that is indicative of the quality of the signal may also include information facilitating cyclic redundancy checks using polynomials. In such systems, complex polynomials may be utilized that can not only detect, but in some cases correct, single- or multiple-bit errors.

Preferably, this position-measuring device includes means for storing the obtained position, so as to use it in the subsequent processing of the information for example.

Without this being a necessity, the incident beam is preferably obtained from a coherent light source, for example a laser diode.

The optical circuit used may comply with multiple configurations according to the application and to constraints, for example in structures or in bulkiness.

The light beam(s) may thus be sent towards the diffractive support(s) via at least one relay optical component of the mirror, lens, prism, diffractive component, reflective component, refractive component type, and/or via at least one optical guiding component of the optical fiber or waveguide type, the object being the optimization of the positioning and bulkiness of the whole of the constituent components of the measuring device. Optical components as mentioned may also be used at the output of the diffractive support(s).

Said light beam(s) may, depending on the case, also pass through at least one unit exerting a collimating, focusing or astigmatism function. The dimensions of each light beam may thereby be adapted to the size of the individualized diffractive structures.

Under certain assumptions, the light beam(s) may further be sent to the diffractive support(s) via at least one conformation diaphragm. Illumination of the adjacent diffractive structures which may generate erroneous codes or parasitic interferences is thereby avoided.

According to one possibility, the means for detecting and reading the diffracted optical codes may consist of photodetectors of the array strip, grid or pixel matrix type, CCD sensors, photodiodes, or even photoelectric or photovoltaic cells, positioned on the trajectory of the rays diffracted by the diffractive support(s). The number and the arrangement of the pixels or sensors are defined, according to the application, depending of the accuracy and/or the rapidity which the information processing should achieve.

According to a possible configuration, the photodetectors may be positioned so that each optical spot or structure obtained at the location where a diffracted ray encounters a pixel array, covers at least 3 pixels. With this, the obtained optical signals may be better detected. Conversely, a gain in processing rapidity may be obtained by detection with only one cell.

Also, the number of pixels between two adjacent spots is set to at least three pixels. Practically, the detection unit is a photodetector component which exists on the market.

In certain configurations, the light beam(s) are directed at an incidence normal to the diffractive support, although this may mean that this feature involves a more cumbersome optical circuit, i.e., comprising more components than the relay optical components for directing the beam(s).

Conversely, if the light beam is tilted towards the diffractive support, preferably with an angle between 0° and 45° relatively to the normal, the circuit followed by the beam(s) may be simplified as the latter is more directly turned towards the support.

The device may further include synchronization means for detecting and reading an optical code generated by an individualized diffractive structure exclusively when the ray emitted by the light source is centered on said structure for example.

According to an exemplary embodiment, synchronization means may include specific photodetectors dedicated to detecting optical structures obtained independently from those forming the code of the position to be measured, for example, light spots positioned on at least one diffractive track specifically dedicated to synchronization.

An application in which the different hitherto contemplated parts of the invention are particularly of interest, is the measurement of the rotary movement of at least a diffractive support permanently attached to a rotary shaft.

In this case, in order to produce an absolute angle sensor over several revolutions, it is even possible to associate two superimposed diffractive rotary disks, one including the measurement of angular position on one revolution and the other, rotating N times slower, allowing the number of accomplished revolutions to be measured within the limit of N revolutions.

The present invention also relates to a method for calculating the position of a component relatively to another one, from an optical signal generated by a diffractive support, said signal generating a code consisting of optical structures with variable intensity distributed over the detection means, the method consisting of:
  detecting the status of each optical structure and assigning it to an electronic state corresponding to its intensity;
  calculating the value of the code of the measured position
  assessing the quality of the optical signal;
  converting said code into a linear or angular distance;
  assessing the reliability of the distance; and
  correcting the distance to produce a distance with improved reliability.

As an example, the invention on the whole may perfectly be applied to a steering column of a vehicle.

BRIEF DESCRIPTION OF THE DRAWINGS

Other features and advantages will also become apparent from the detailed description appearing hereafter, with reference to the appended non-limiting drawings, according to which:

FIGS. 6-9 illustrate examples of coded optical signals and of their processing during rotation of the diffractive support;

DETAILED DESCRIPTION OF THE PREFERRED EMBODIMENTS

Figure 1:
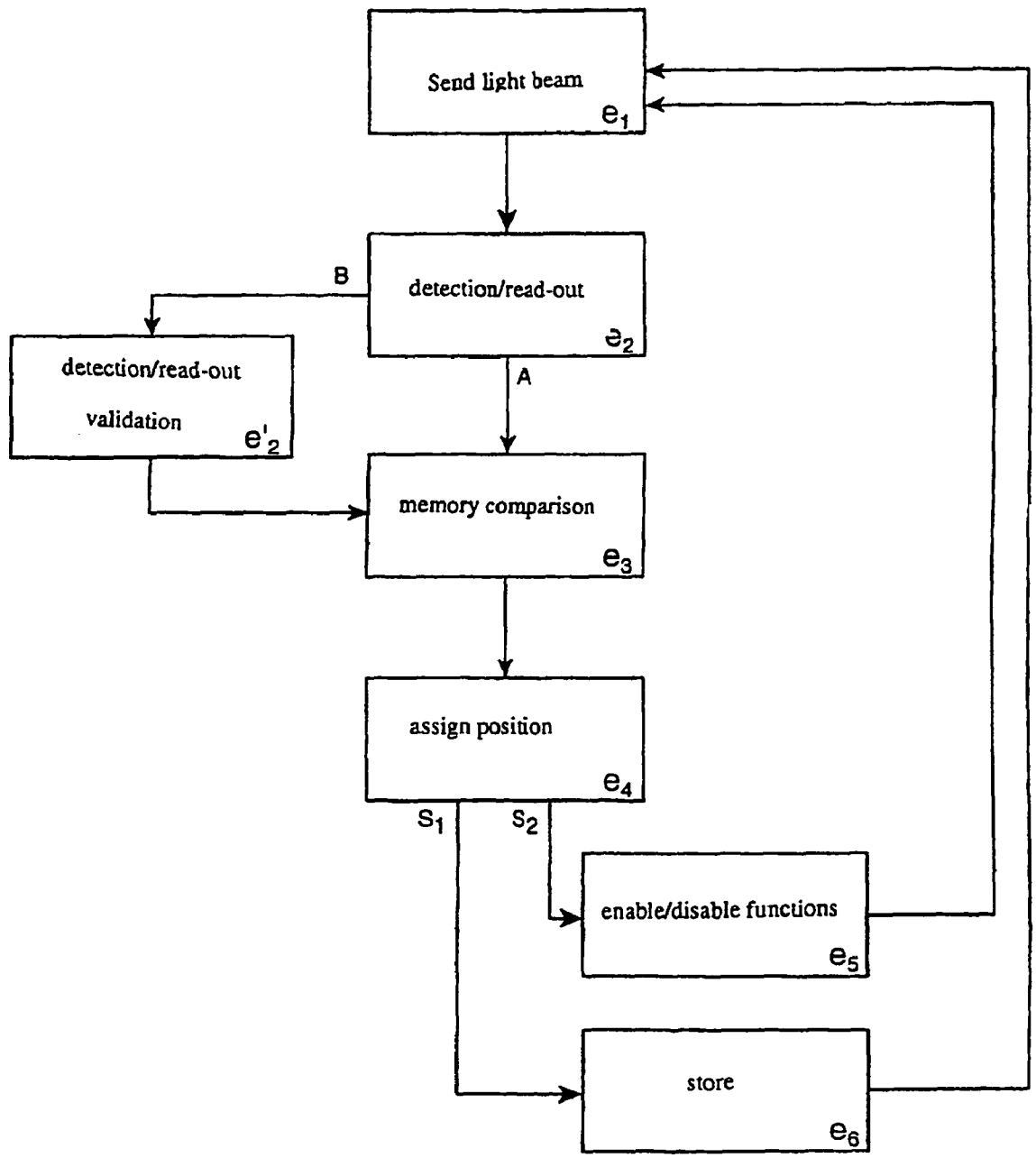
FIG. 1 is a flow chart of an exemplary embodiment of the method according to the invention.

The present invention relates to a method for determining the position of one of two components in relative motion to each other. The method uses optical means. For example an exemplary functional flow chart is schematized in FIG. 1.

The method according to the invention according to step ($e_1$) consists of directing at least one light ray emitted by a light source onto a diffractive support (1) provided for generating an optical signal. The latter is indicative of the positioning of the support relatively to a fixed mark. The optical signal is produced by the diffracted support (4) by transmission and/or by reflection.

According to a following step ($e_2$), the method consists of detecting and reading at least one constituent optical code of the signal. This diffracted signal corresponds to a unique position of the diffractive support (1) and includes information indicative of its quality. The optical code according to step ($e_3$) is then compared via a memory table with prerecorded data corresponding to positions. With this method, according to step ($e_4$), a position may thereby be assigned to each detected optical code.

By assigning a specific position of the diffractive support and therefore of other components permanently attached to said support, it is possible to enable and/or disable various functions or functionalities. The latter are for example involved in the handling and controlling of the operation of a vehicle.

In an exemplary embodiment, the information that is indicative of the quality of the signal may include error detecting and correcting codes such as parity codes, information facilitating checksum operations, and information facilitating polynomial redundancy checks. For example, parity (even or odd) codes enable the counting of the quantity of "ones" in a word, and a parity code is indicative of whether there are an even or odd number of "ones." In an embodiment utilizing a parity code as an indication of quality, the receiving system may count the number of ones and compare the resulting count to the parity bit. In such a system, a disagreement may indicate an error and thus the system may assess the signal as unreliable (i.e., exhibiting poor quality). It should be noted that this method can detect single-bit errors and some multiple bit errors, but may be unable to correct the signal or otherwise improve its quality without additional means for doing so.

The information that is indicative of the quality of the signal may also include information facilitating checksum operations. Checksums can be used on groups of data words wherein the sum of the data words is calculated and stored with the data. In such systems, the receiving system calculates the same checksum and compares it with the received checksum. In such a system, a disagreement may indicate an error and thus the system may assess the signal as unreliable (i.e., exhibiting poor quality).

The information that is indicative of the quality of the signal may also include information facilitating cyclic redundancy checks using polynomials. In such systems, complex polynomials may be utilized that can not only detect, but in some cases correct, single- or multiple-bit errors.

It should be noted that error detection may be implemented in a digital system through the use of error detecting codes and error correcting codes. These codes may involve inserting redundant information into a sequence of digital numbers. The redundant information is calculated according to specific rules that allow errors of a certain magnitude within the sequence to be detected, and in some cases, corrected. Examples of error detecting and correcting codes include: even parity, odd parity, checksums, and Cyclic Redundancy Checks (CRC).

In accordance with the invention, an error detecting or error correcting code may be included within each Computer Generated Hologram on the sensor disk. In this approach, each position encoded within the disk includes redundant information that facilitates execution of an error detecting or error correcting algorithm. Such algorithms enable the self-diagnosis of a wide variety of transient or permanent errors, and in some cases, facilitate the correction of those errors.

A particularly unique aspect of this implementation involves taking advantage of the fact that this is a position sensor, and that a time sampling of positions reveals that these are not a random sequence of numbers. Specifically, if the disk is at position $\theta 1$ at time t1, then if it is sampled again a very short time later, then $\theta 1-\Delta < \theta 2 < \theta 1+\Delta$, where $\Delta$ is the maximum amount the position can change during the time interval. Therefore, even if a relatively simple error detecting code is utilized, such as parity, then there is the opportunity to do internal correction, at least to some level of degraded accuracy.

In practice, it is recognized that in order to smoothly transition from one position to the next in the digital realm, a gray code is used to encode the position information. A gray code is devised so that each transition from one position to the next involves a change in only one bit. An example 3-bit gray code sequence is:

000, 001, 011, 010, 110, 111, 101, 100

Assuming that a parity bit is used to detect an error in this 3-bit code, and an error was detected when the previously read position was 010, if the $\Delta$ during the sampling interval is 1, then the next reading would have to be either 011 or 110. If the value reported was 001, then knowing that parity detects a single bit error means that the true value must have been 011. Other logical deductions are also possible, given the various patterns that are possible.

According to an alternative application of the method according to the invention, it is possible, prior to the comparison step ($e_3$) with a memory table, to proceed with a step for validating ($e'_2$) detection and reading. With this, it may notably be checked whether detection and reading were carried out under proper conditions not affecting the accuracy of the result of reading.

According to an alternative embodiment of the method, by assigning a position to the diffractive support (1), it is possible to enable or disable functions or functionalities for information purposes. For example, here, these are indicative functions providing return of information to the user.

According to still another embodiment of the method, assigning the position may quite simply result, according to step ($e_6$), in storing the new position, thereby detected and read. The cycle for determining the position may resume according to a pre-established frequency.

Figure 2:
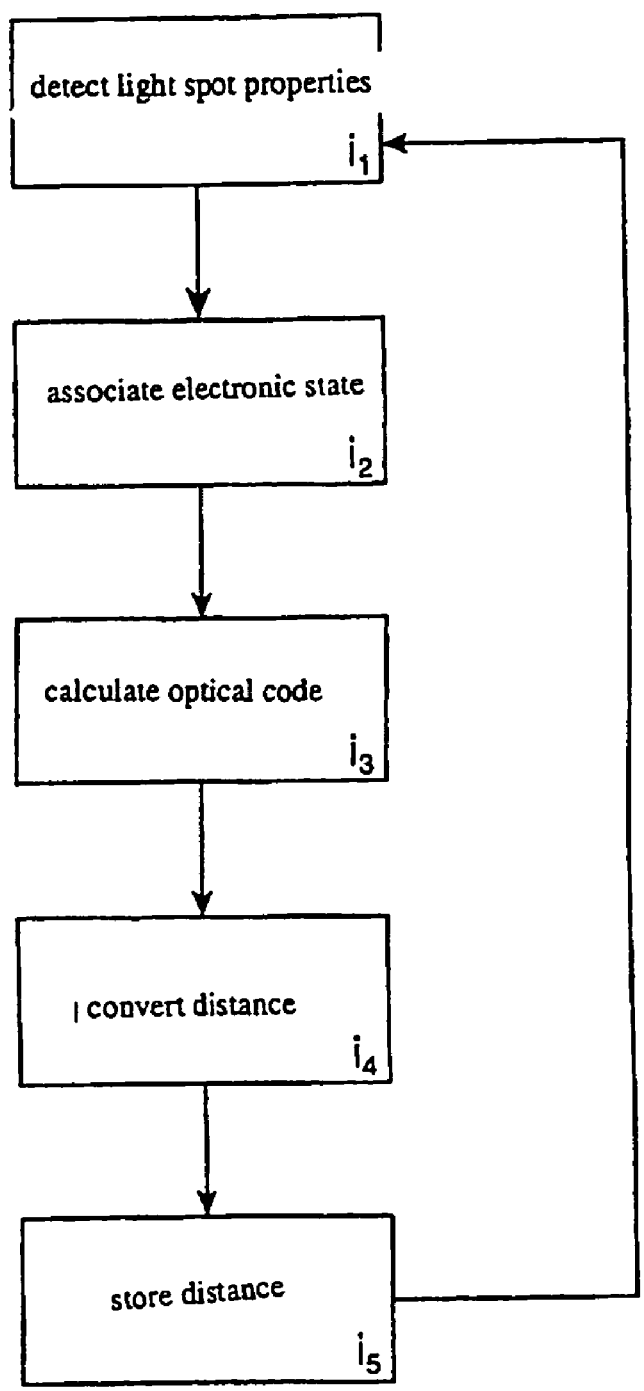
FIG. 2 is a flow chart of an exemplary embodiment of a calculation method according to the invention.

The present invention also relates to a calculation algorithm, a flow chart of which is e.g. schematized as an example in FIG. 2. This algorithm comprises a series of instructions I1, I2, I3, I4, I4, I5 being used for applying the determination method according to the invention. The first instruction I1 is directed to detecting the properties of diffracted light spots or optical structures. According to a second instruction I2, the algorithm allows an electronic status to be associated with each diffracted optical code. According to a following instruction I3, the diffracted optical code read by the detectors is then processed by calculation means, so as to be able to convert it into a distance or an angular deviation according to an instruction I4. According to another instruction I5, this distance or angular deviation is stored.

Figure 3A:
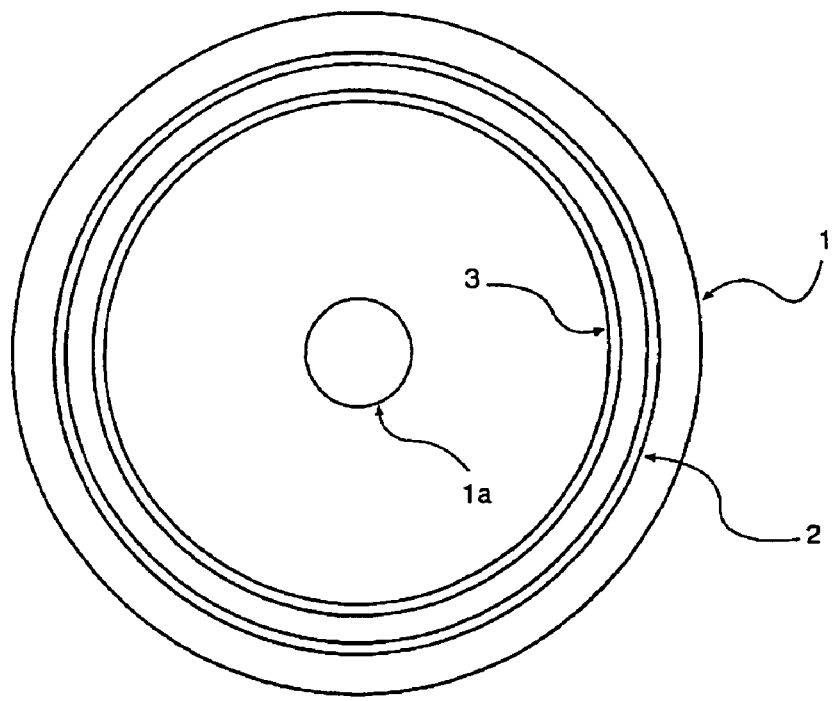
FIGS. 3a and 3b are exemplary embodiments of a diffractive support according to the invention.
Figure 3B:
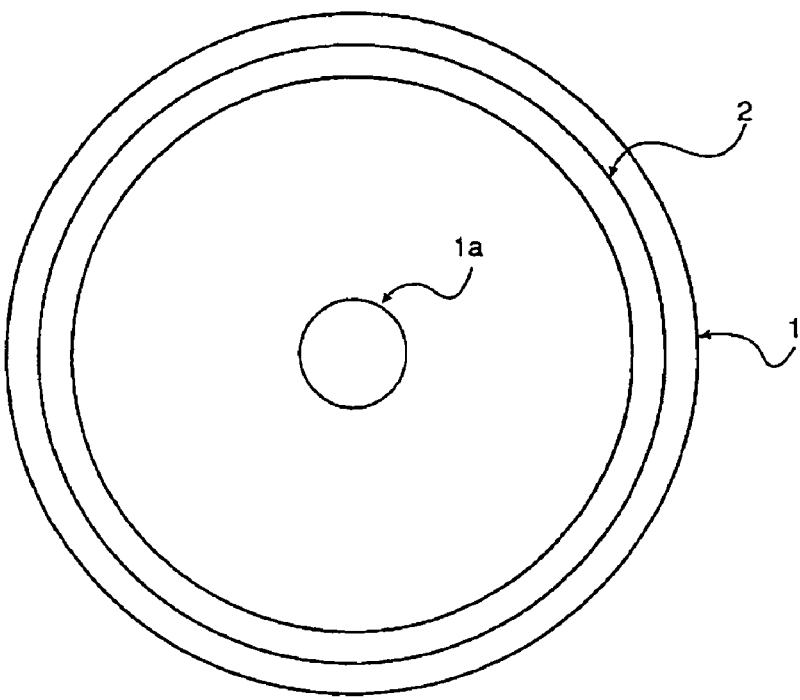

An exemplary diffractive support (1) according to the invention is for example illustrated in FIG. 3a or in FIG. 3b. Said diffractive support includes means for mounting on a first component in relative motion with respect to a second component, as well as at least one diffracted track (2, 3) either continuous or not. The diffractive tracks (2) or (3) have diffracting means by reflection and/or by transmission of the light emitted by at least one light source, fixed relatively to the second component.

The diffractive support (1) for example includes a rigid disk and a means for mounting (1a) it on a rotary shaft as well as at least one ring-shaped diffractive track (2) or (3) extending over 360°. The diffractive tracks (2) or (3) for example have a relief etched into the constituent material of said support (1), the reading of which allows the position of the first component (i.e. the diffractive support) to be identified relatively to a second component (fixed mark). The diffractive support (1) consists of a synthetic material of the polycarbonate, PMMA (polymethyl methacrylate) type or of any other organic material having adequate optical properties.

The diffractive tracks (2) or (3) may also be obtained with an opaque material added to certain locations on a transparent support. The light intensity of the wave front diffracted by the diffractive support and focused on the detection means is read. The reading allows the position of the first component to be identified relatively to the second component. The relief or the opaque material, the shape and distribution of which are calculated by computer, generate a particular diffracted optical signal under the action of a light source, said signal being an optical code defining a particular position of the support. Each track (2, 3) is divided into areas of individualized diffractive structures (4, 5) for example illustrated in FIGS. (4a) and (5a), and generating a code corresponding to a unique position of the support (1).

The diffractive tracks (2, 3) may also be produced with transparency or refractive index modulation.

FIG. 3b shows an exemplary embodiment in which the rigid disk only includes a single diffractive track (2). The latter may however consist of several adjacent diffractive annular sectors.

It has been noted that the disks, as well as some of the components, may be subject to error due to manufacturing imperfections, dirt, damage or degradation. It has also been noted that other potential sources of bit errors include manufacturing imperfections in the encoded disk, damage occurring after manufacture, accumulation of foreign matter such as dirt on a lens, mirror, or sensing array, electrical noise, abnormalities in the signal processing algorithms that could cause misinterpretation of a 1 or 0; and mechanical misalignment of the components.

It has also been noted that there are many places throughout a sensor system that are potential sources of error. These sources of error include scratches, blemishes or other physical defects in the disk itself, scratches, blemishes or other physical defects in the detector array, electrical transients (noise) throughout the system, calculation errors in the adaptive threshold algorithms or other parts of the software, A/D conversion errors, and foreign contamination (dirt) of the signal anywhere throughout the optical path. As a result of these recognized sources of erroneous information, it has been found to be beneficial to also include information that is indicative of the quality of the optical signal or the resulting position information.

Figure 4A:
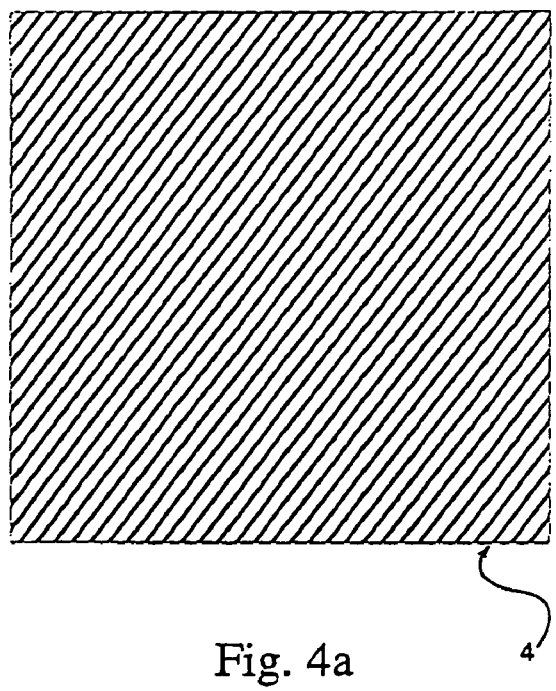
FIGS. 4a and 5a are exemplary embodiments of details of diffractive tracks of a diffractive support according to the invention.
Figure 4B:
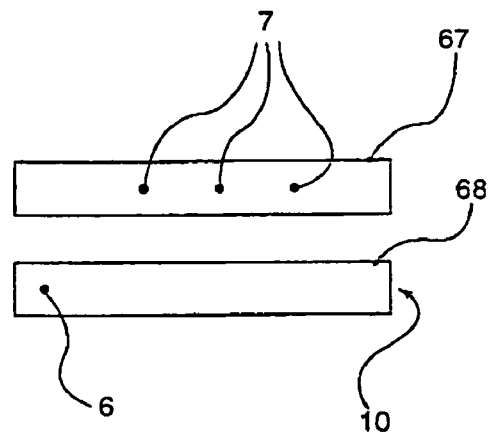
FIGS. 4b and 5b illustrate coded optical signals diffracted by the details of diffractive tracks of FIGS. 4a and 5a, respectively.
Figure 5A:
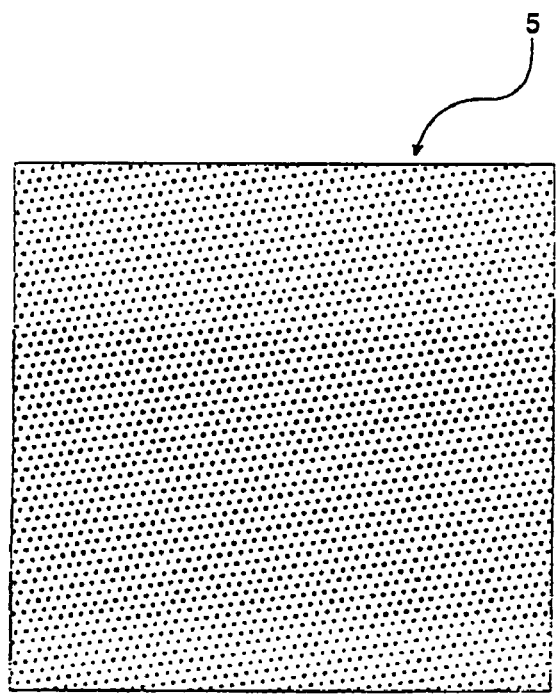
Figure 5B:
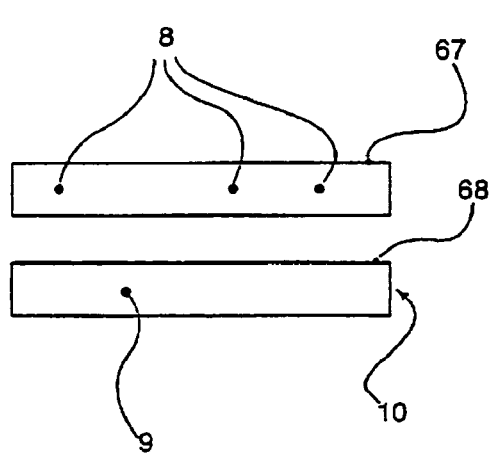

An example of each obtained code is for example materialized in FIGS. (4b) and (5b). Each area of individualized diffractive structure for example includes a plurality of elementary shapes positioned as a grid of these shapes, for example as 128×128 or 128×256. The optical signal forming the optical code defining a particular position of the support relatively to the beam, and examples of which are illustrated in FIGS. (4b) and (5b), for example consists of diffractive light spots (6, 7, 8, 9), i.e., in the case in point, light spots of the first diffraction order and, if necessary, of its conjugate (not shown). The following diffraction orders are not utilized but retained in the diffracted optical signal. An exemplary first diffraction order is marked by reference 10 in FIGS. 4b and 5b. Without departing from the scope of the present invention, the use of the second diffraction order and, if need be, its conjugate order, may also be contemplated.

As an example, each diffracted track (2) or (3) is divided into angular sectors with equal surfaces forming the individualized diffractive structures. For example the angular sectors have dimensions of the order of 10 µm to 100 µm. Each diffracted track (2) or (3) preferably comprises at least 3,600 angular sectors in order to obtain accuracy less than 0.1° in determining the position of the support.

Figure 17:
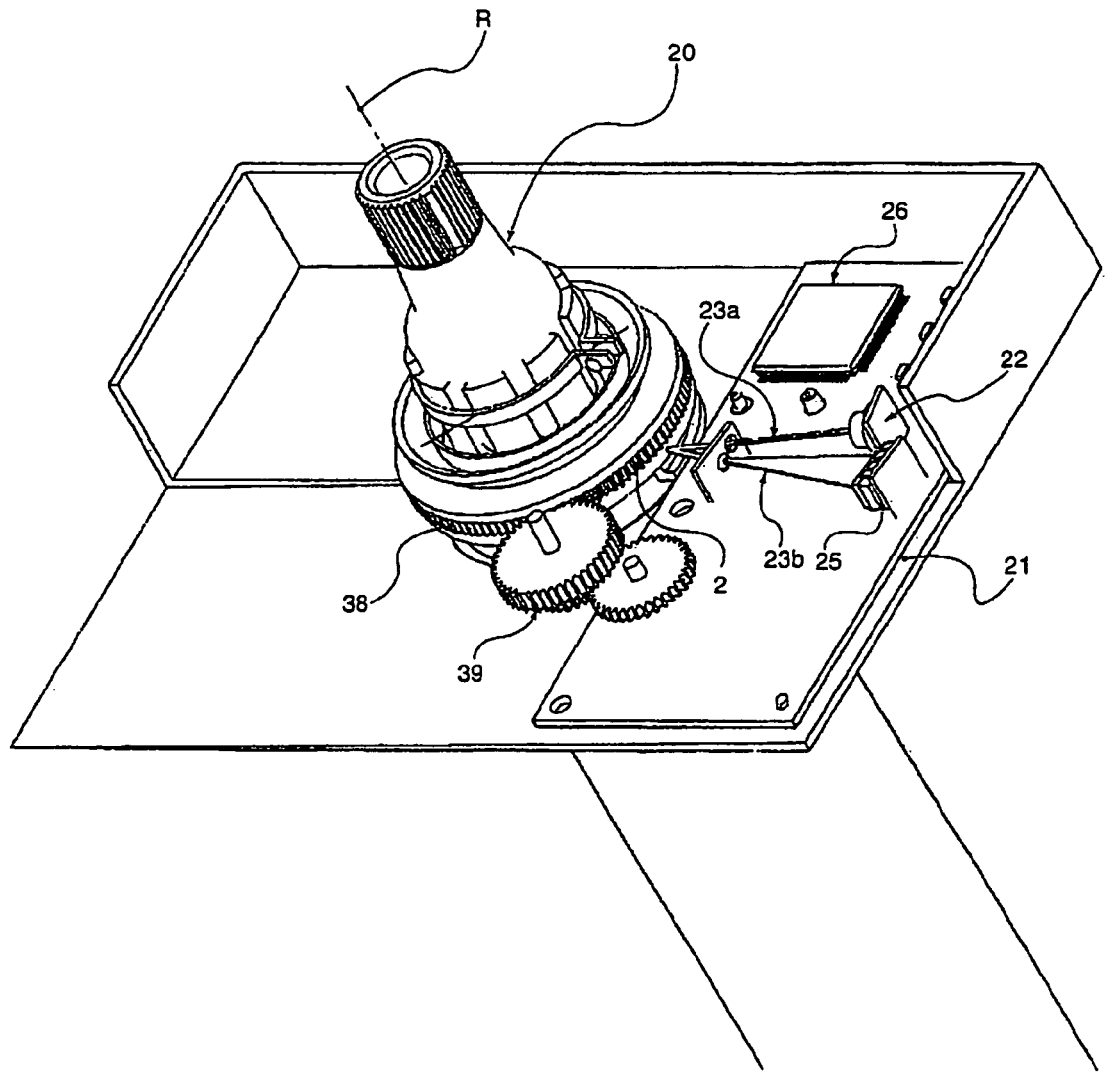
FIG. 17 illustrates another exemplary embodiment of a diffractive support according to the invention.

According to an exemplary embodiment, for example illustrated in FIG. 17, the diffractive track (2, 3) is positioned on a self-adhesive support. The latter may then be added, or more particularly adhered, onto any support and notably onto a support with a cylindrical aspect of the steering column shaft type. The dimensions of the diffractive support (1) may thereby be adapted to a location or to a particular shape. Reduced bulkiness and a large flexibility to use are obtained for the diffractive support (1).

In FIGS. 6-9, four successive positions of a diffracting support, relatively to a fixed mark, have been schematized. This fixed mark is materialized by a fixed diaphragm and/or collimating unit (12) associated with the light source. The diffractive support (1) includes individualized diffractive structures (13) and the displacement is materialized behind the unit (12) in FIGS. 6-9. With the method according to the invention as illustrated in FIG. 6, it is possible to read a diffracted code (10) which varies according to the position of the individualized diffractive structure (13) and consequently of the diffractive support (1) relatively to the collimating unit. The diffracted code (1) which corresponds to the first diffraction order therefore has a development transcribed via detection means with a threshold level, which measure light intensity variations for example. Three light spots reaching a maximum intensity level Imax as well as a spot without light are thereby obtained in FIG. 6. A code in the form of 1 1 1 0 is thereby obtained via transformation means of the analog/digital converter type. When the diffractive support (1) continues to rotate around its axis of rotation, an angular deviation of the individualized diffraction structure (13) is expressed by another light distribution over the diffraction spots. Three light spots with reduced light intensity but with a level larger than the minimum detection level Io, are thereby obtained. The fourth spot then passes from a spot without light to a spot with low intensity less than the minimum level Io. The thereby obtained digital optical code thus remains unchanged. On the other hand, further rotation of the individualized diffractive structure (13) is expressed by a distribution of the light intensity in the first diffraction order so as none of said light spots are detected. The detected intensity actually is less than the minimum level Io. The optical code translated as 0 0 0 0, is thereby obtained. When the individualized structure (13) eventually is about to leave the collimating window (12), a fourth light spot exceeding the minimum threshold level Io is obtained, as well as three weaker light spots less than the minimum level Io and therefore being expressed by an optical code as 0 0 0 1. The 0 levels are very conspicuous and materialized by dotted lines in FIGS. 6-9 and levels 1 are materialized by bold lines. At each position of the diffractive support (1) and therefore in the individualized diffractive structure (13), a unique optical code is thereby obtained according to a level of resolution determined by the system.

The present invention also relates to a device for measuring the position of a first component in relative motion with respect to a second component. Such a measuring device and more specifically different alternative embodiments of this device are for example illustrated in FIGS. 10-17.

Figure 10:
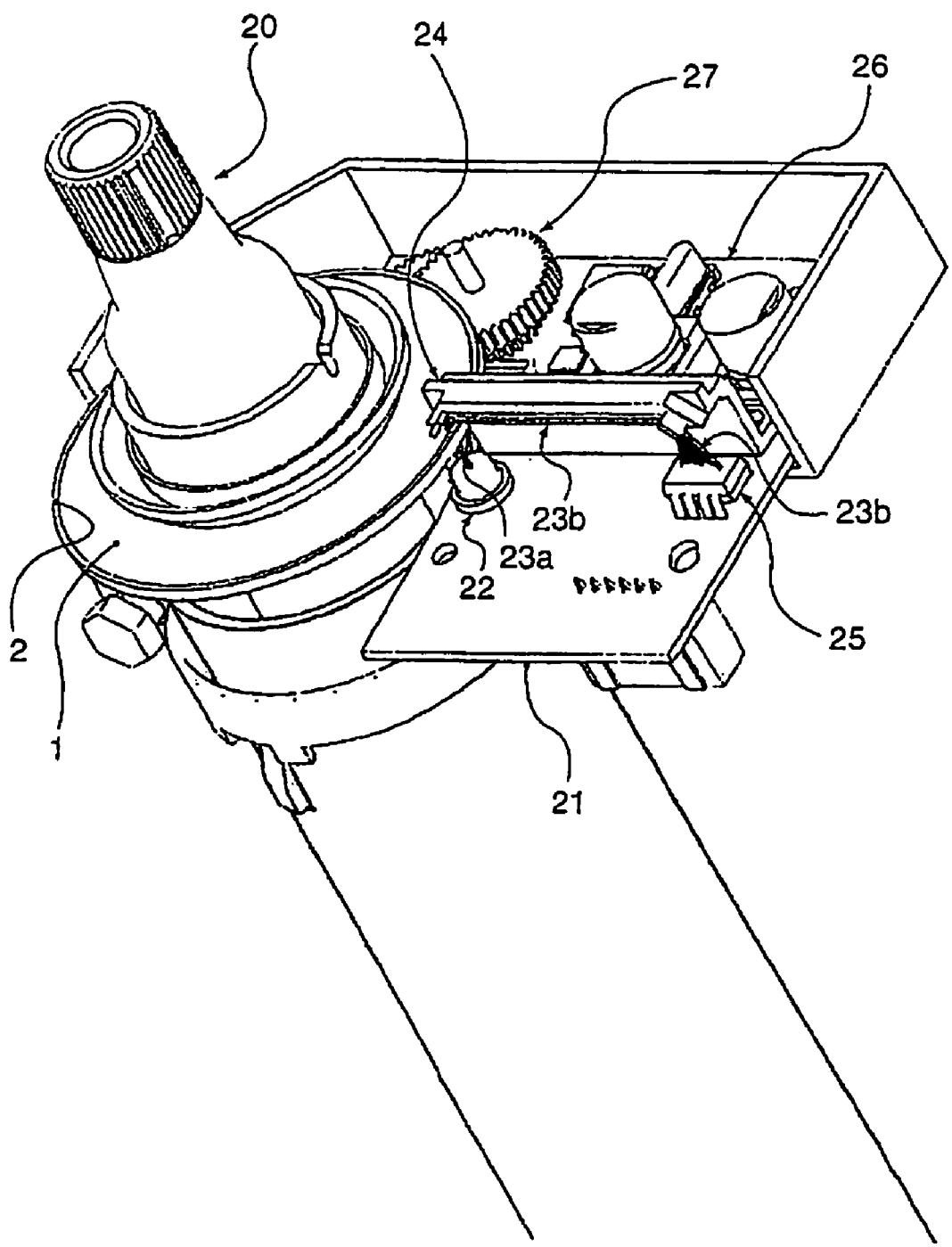
FIG. 10 illustrates an exemplary embodiment of a measuring device according to the invention.

In the exemplary embodiment illustrated in FIG. 10, a steering column (20) is shown, onto which the diffracted support (1) is added. The latter for example has on its periphery a ring-shaped diffractive track (2). The diffractive support (1) is permanently attached to a rotary shaft by any known means. The measuring device according to the invention is positioned adjacent to the diffractive support (1) on a fixed support (21). The measuring device includes a light source (22) emitting an incident beam (23a) crossing the diffractive track (2). The illustrated exemplary embodiment thus operates by transmission on the diffractive support (1). The incident beam (23a) is diffracted at (23b) by the diffractive track (2). This diffracted beam (23b) is then guided via an assembly (24) for example including a wave guide and mirrors, towards detection means (25). The latter are controlled by adequate electronic means, with which the different optical codes diffracted by the diffractive support (1) during its rotation may be analyzed.

A set of gears (27) is also provided for driving a complementary diffractive support at a different rotational velocity, thereby enabling the number of revolutions to be counted and the absolute position to be coded over the whole steering wheel travel i.e., as a rule, plus or minus 4 or 5 revolutions.

Figure 11A:
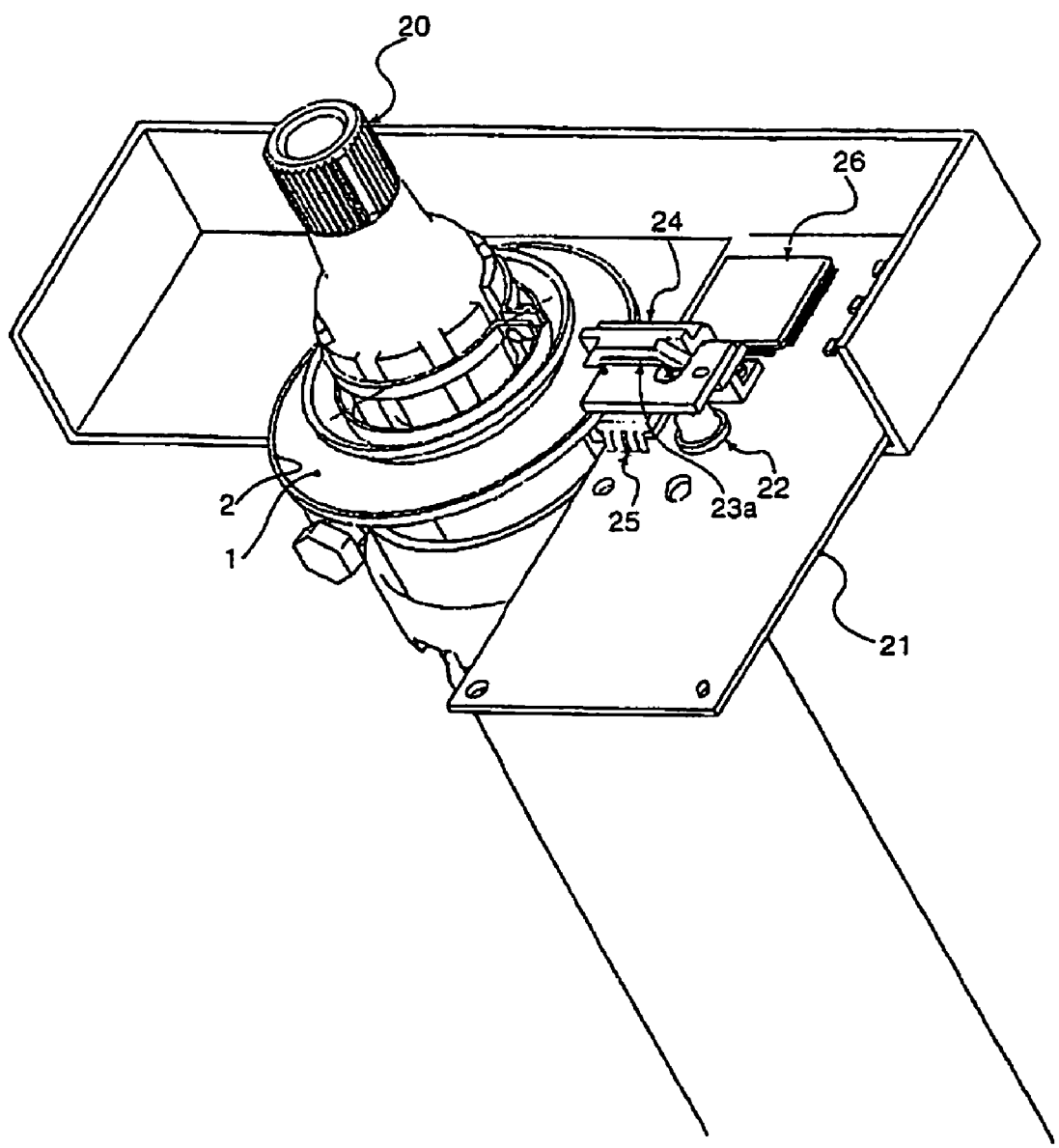
FIG. 11a illustrates a first alternative embodiment of the measuring device of FIG. 10.

In the exemplary embodiment illustrated in FIG. 11a, the detection and reading means (25) are positioned at least partly directly under a peripheral area of the diffractive support (1). The light source (22) emits an incident beam (23a) which is notably directed via a set of mirrors (24) onto the upper surface of the diffractive track (2). The diffracted code optical signal is then read by transmission under the diffractive support (1). This exemplary embodiment provides substantial reduction in bulkiness of the device according to the invention.

Figure 11B:
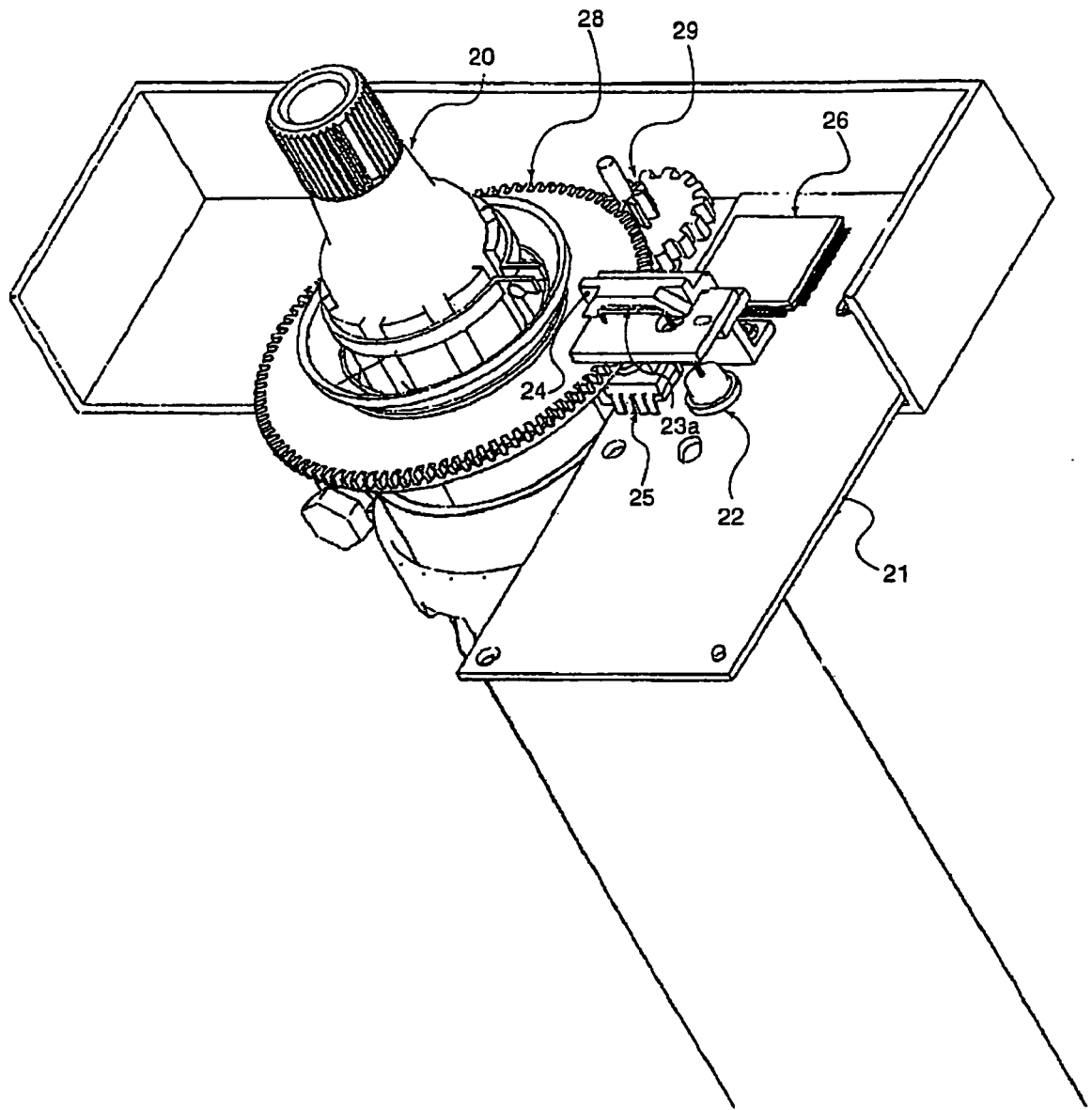
FIG. 11b illustrates a second alternative embodiment of the device of FIG. 10.

In the exemplary embodiment illustrated in FIG. 11b, the diffractive support (1) is associated with a toothed wheel (28), which drives a complementary set of gears (29).

A set of gears (29) is also provided, the function of which is identical with that of the set of gears (27).

As an example, the diffractive track may be directly added onto the toothed wheel (28) which thereby forms the diffractive support.

According to another exemplary embodiment, the toothed wheel (28) is made in a transparent material for the incident beam (23a).

Figure 12:
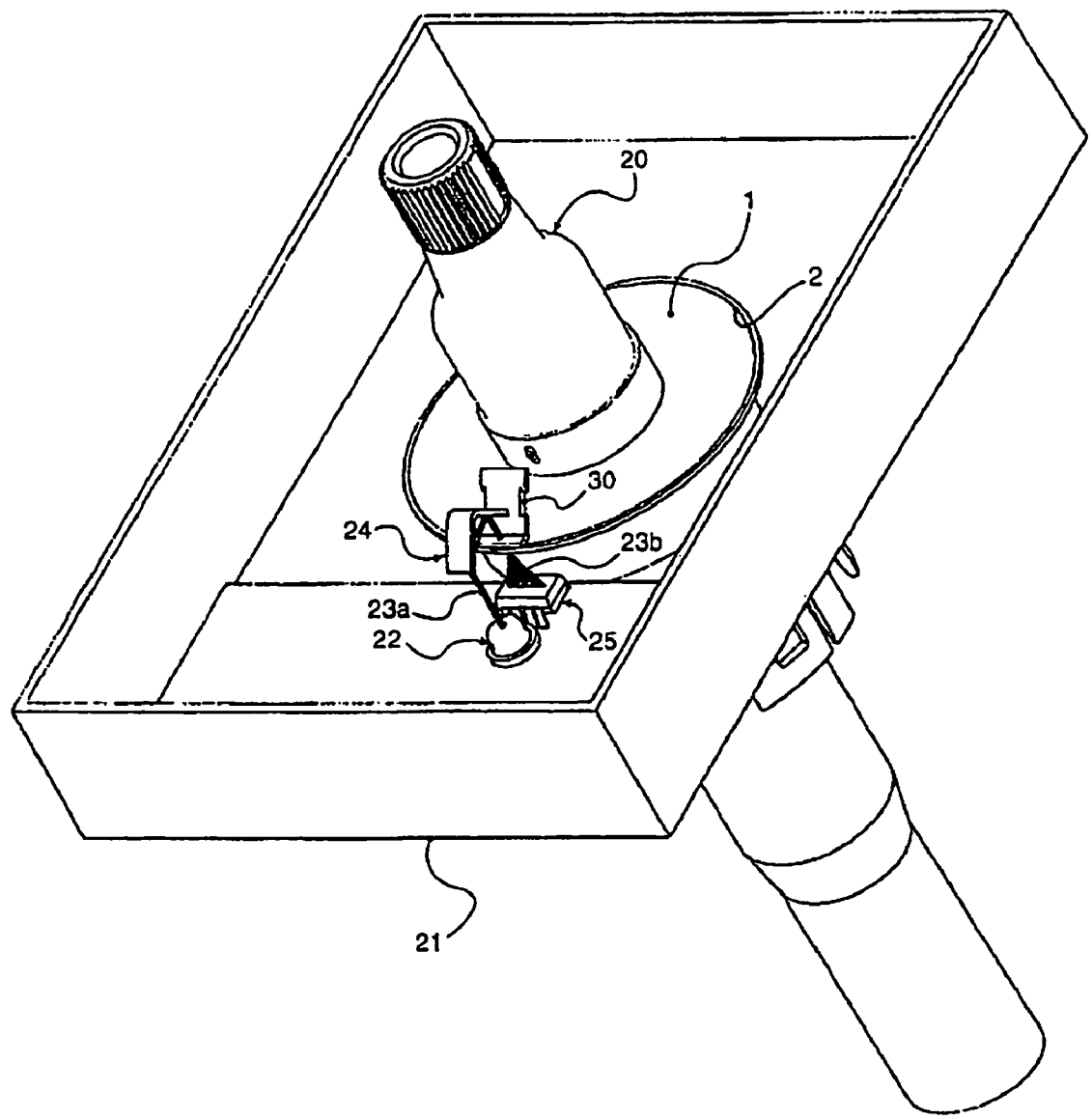
FIG. 12 illustrates another exemplary embodiment of the measuring device according to the invention.

According to another exemplary embodiment for example illustrated in FIG. 12, the measuring device comprises an optical unit (30) with which a diaphragm may be made in order to conform the incident optical beam (23a).

Figure 13:
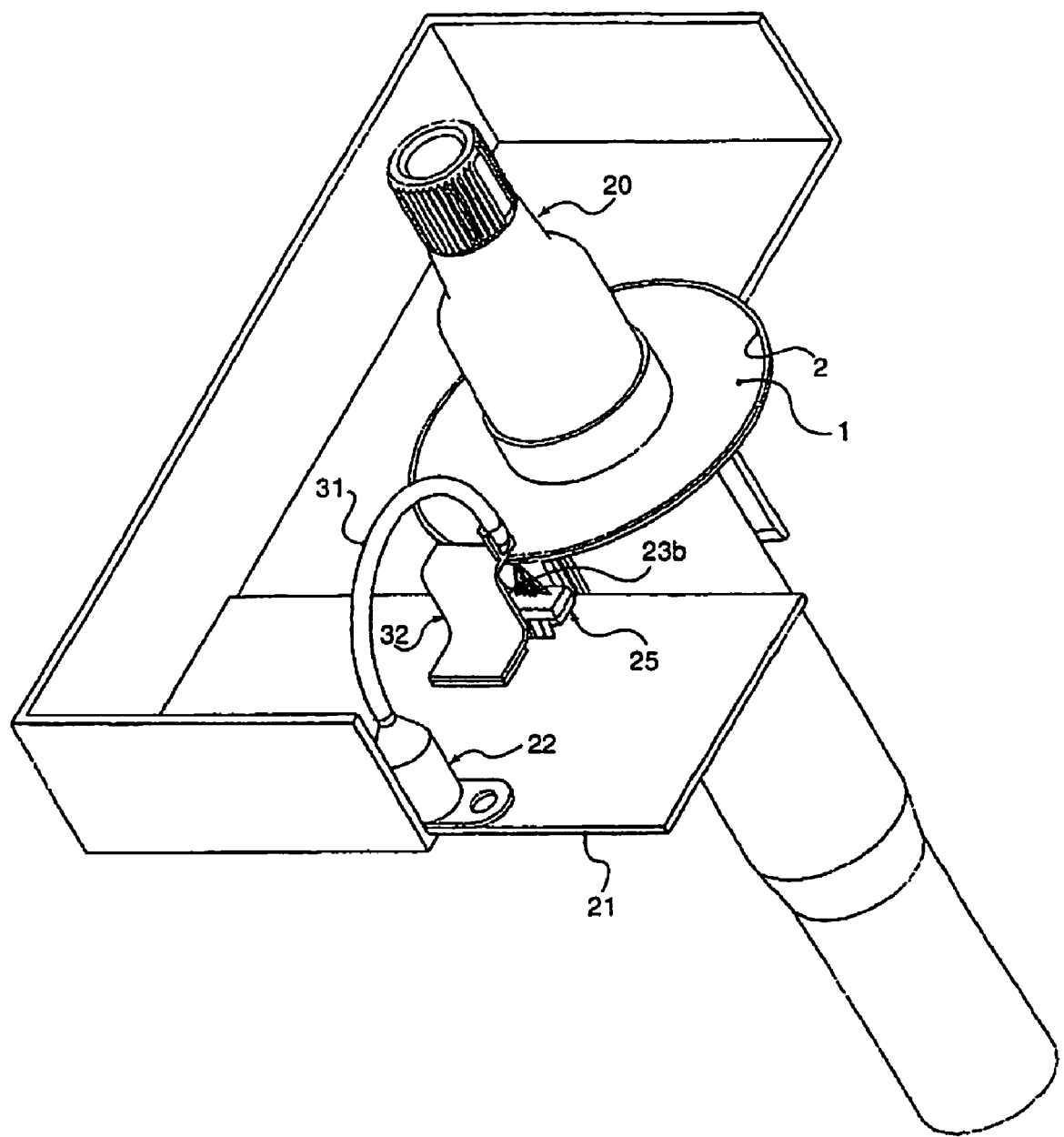
FIG. 13 illustrates another exemplary embodiment of the measuring device according to the invention.

According to another exemplary embodiment, illustrated in FIG. 13, the fixed light source (22) is associated with an optical guide (31) sending the light ray onto the diffractive track (2). The diffracted beam (23b) is then read by the detection means (25) by transmission. The optical guide (31) is for example made with optical fibers. The variability of the positioning of the light source (22) may thereby be substantially improved without being detrimental to the performances and other advantages of the measuring device according to the invention, which imparts greater flexibility to the assembly.

Figure 14:
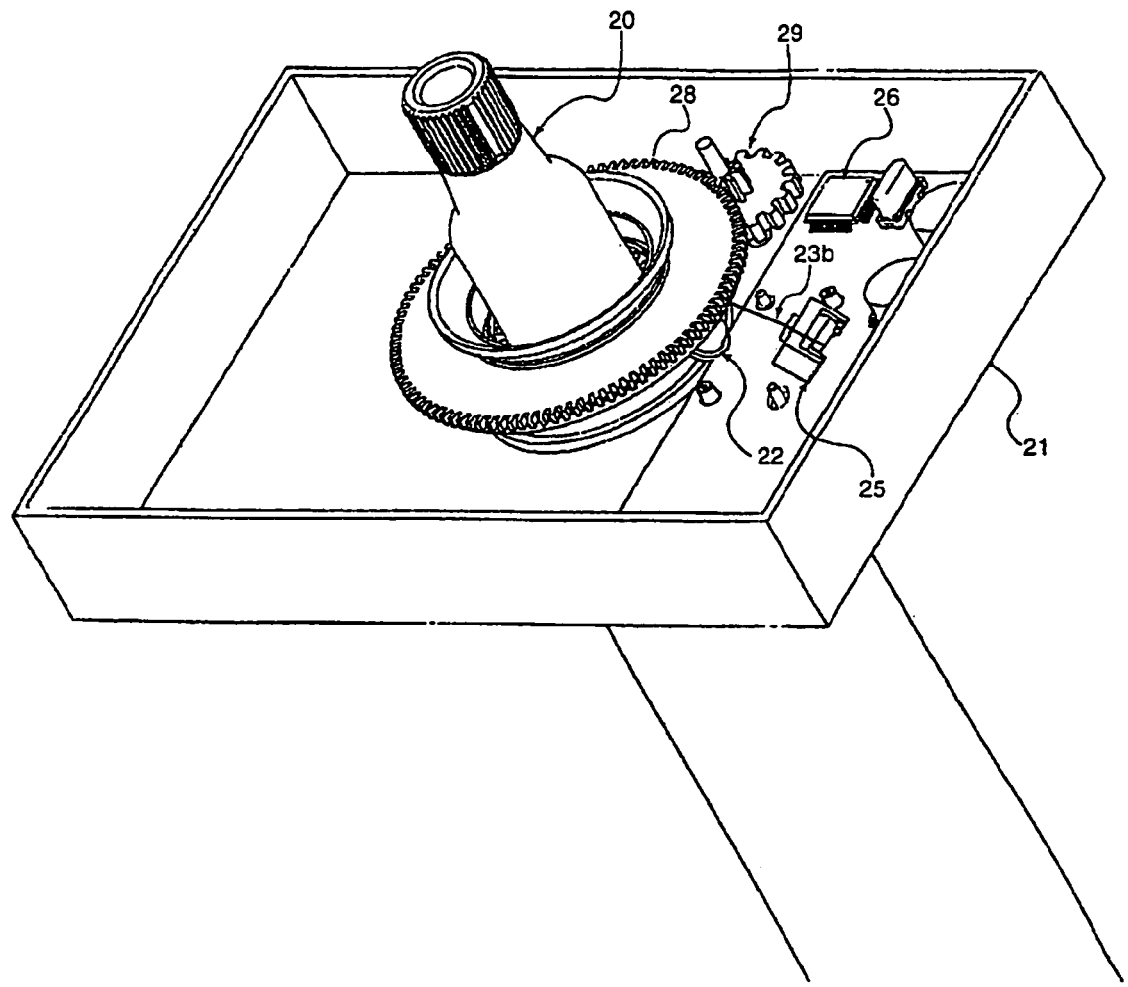
FIG. 14 illustrates another exemplary embodiment of the measuring device according to the invention.

In the exemplary embodiment illustrated in FIG. 14, the diffractive support (1) is positioned under the toothed wheel (28). The fixed light source (22) is also positioned under the diffractive support (1) and emits an incident beam tilted relatively to the normal so as to obtain a diffracted beam directed towards the reading means (25). By selecting the angle of incidence as well as by using a diffractive support by reflection, the positioning and the orientation of the fixed light source (22) on the one hand and of the reading detection means (25) on the other hand, may be optimized.

According to another exemplary embodiment not illustrated in the figures, it is also possible to provide a diffractive track (2) positioned on an annular section for example extending taperwise relatively to the axis of rotation. With diffraction by reflection on this tapered section including the diffractive track (2), it is also possible to optimize the positioning of the light source (22) on the one hand and that of the detection means (25) on the other hand.

Figure 15:
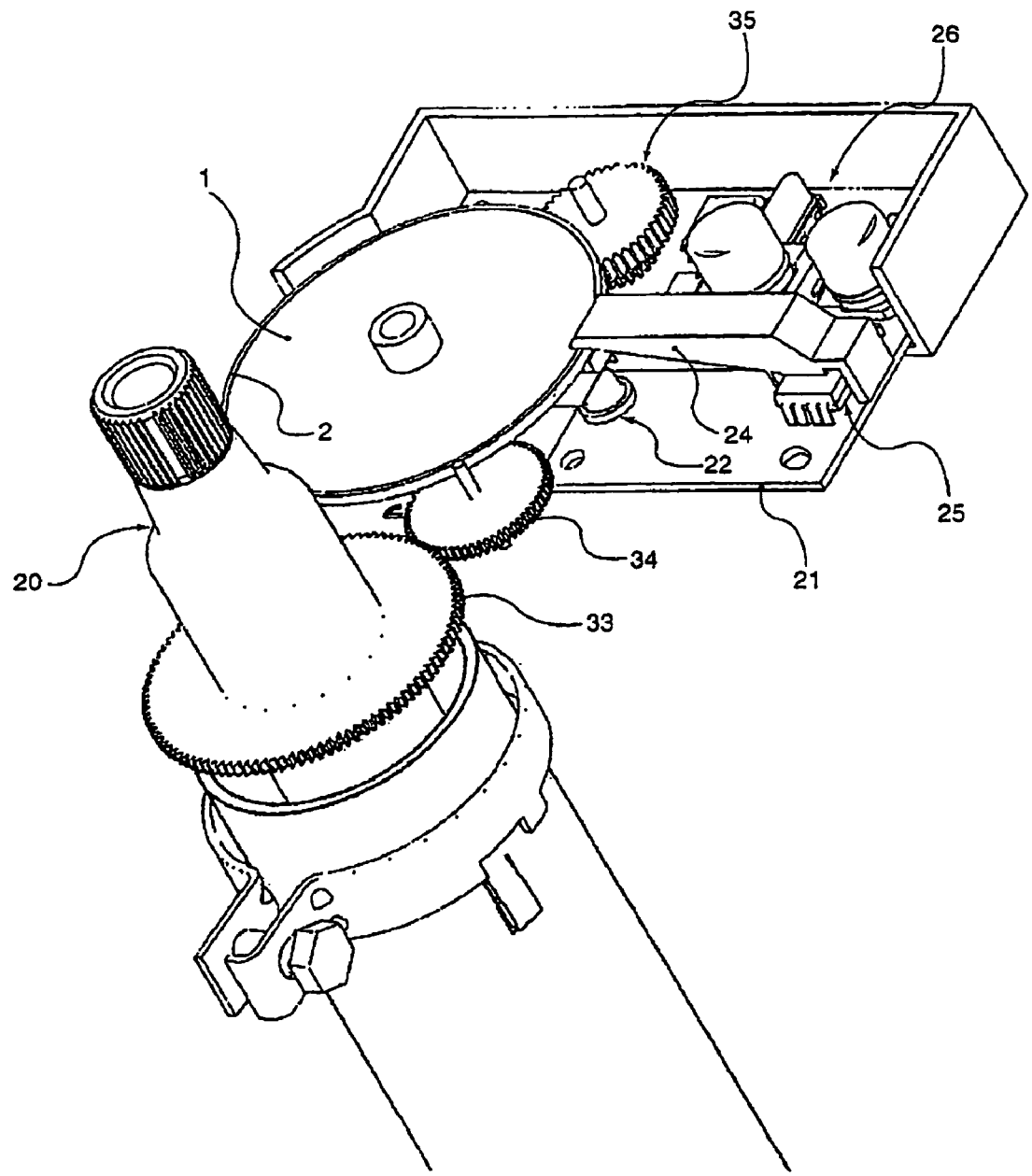
FIG. 15 illustrates another exemplary embodiment of the measuring device according to the invention.

According to another exemplary embodiment according to the invention and illustrated in FIG. 15, the steering column (20) is permanently attached to a toothed wheel (33) and the diffractive support (1) is not directly mounted on said steering column (20). It is rotationally mounted on the fixed support (21) and driven into rotation by the toothed wheel (33) via an intermediate toothed wheel (34). A complementary toothed wheel, not illustrated, permanently attached to the axis of rotation of the diffractive support (1), is also provided. This complementary and axial toothed wheel also drives a complementary set of gears (35), the function of which is identical with that of the set of gears (27).

The fixed light source (22) is positioned on the fixed support (21) and under the diffractive support (1). The incident beam is thereby diffracted by the track (2) by transmission and guided via a set of mirrors (24) towards the detection and reading means (25), which are associated with electronic processing and analysis means (26) which are also provided on said fixed support (21).

This exemplary embodiment of the device for measuring and determining the position of the diffractive support (1) has the advantage of merging the components of the device into a fixed sub-assembly adjacent to the steering column (20). The thereby achieved sub-assembly may thus be manufactured and assembled distinctly from the assembling of the steering column (20).

Figure 16:
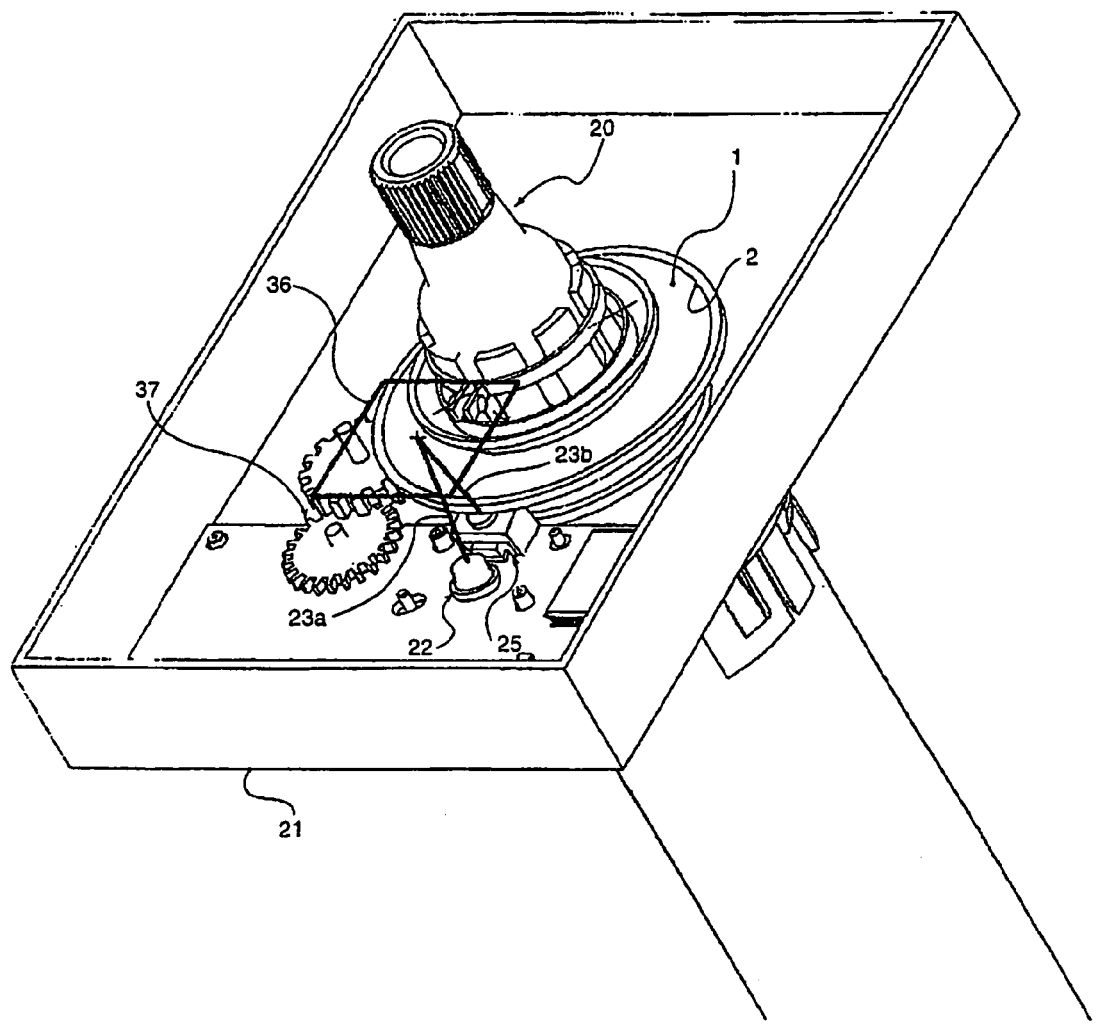
FIG. 16 illustrates another exemplary embodiment of the measuring device according to the invention.

Another exemplary embodiment according to the invention is for example illustrated in FIG. 16. In the latter, the incident beam (23a) is directed with a determined angle of incidence onto a mirror (36). The latter then redirects the incident beams (23a) onto the diffractive track (2) which emits par transmission the diffracted beam towards the reading and detection means (25). By turning the mirror (36), it is possible to optimize the relative positioning between the light source (22) and the reading and detection means (25).

The rotation of the diffractive support (1) also drives an additional set of gears (37), the function of which is identical with that of the set of gears (27).

According to another exemplary embodiment illustrated in FIG. 17, the diffractive track (2) is directly added to the steering column (20) and more particularly onto a cylindrical portion. The diffractive track is for example added via a self-adhesive support onto this cylindrical portion. The light source (22) thus emits the incident beam (23a) towards the diffractive track (2) along a direction extending substantially in a plane normal to the axis of rotation R.

In such an exemplary embodiment, it is possible to position the light source (22) and the detection and reading means (25) away from the diffractive support (1) and consequently from the diffractive track (2). Such an embodiment has the advantage of reducing bulkiness to the extent that it is not necessary to position the light source (22) or the detection and reading means (25) below or above the diffractive track (2). In addition, the diffractive track (2) does almost not increase the radial bulkiness of the steering column (20). The latter is associated with a toothed wheel (38) as well as with an additional set of gears (39), the function of which is identical with that of the set of gears (27).

Figure 18:
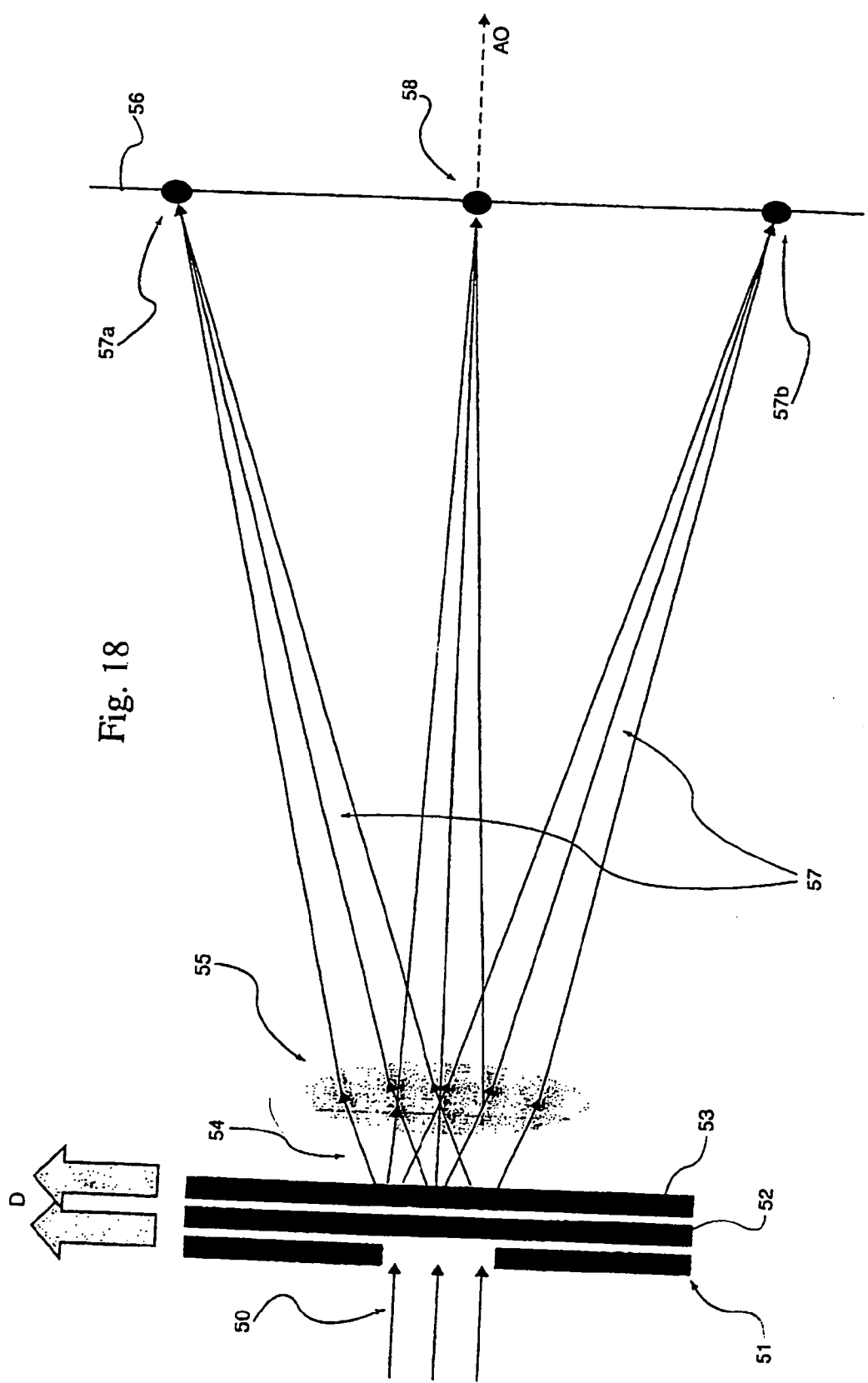
FIG. 18 is a schematic illustration of an exemplary embodiment of a measuring device according to the invention.

FIG. 18 illustrates an exemplary embodiment of a measuring device according to the invention. According to this exemplary embodiment, an incident beam (50) passes through a fixed diaphragm (51). The incident beam (50) is sent onto diffractive supports (52, 53) which may move according to movements illustrated by the arrows D.

The incident beam is diffracted at (51) by the diffractive support. It is then focused by the lens (55). Light spots (50a, 50b) corresponding to portions of the constituent signal of the selected diffraction order and of its conjugate are thereby obtained in a plane (56) containing fixed detection means. Diffraction order 0 is marked on the optical axis AO with reference (58).

Figure 19:
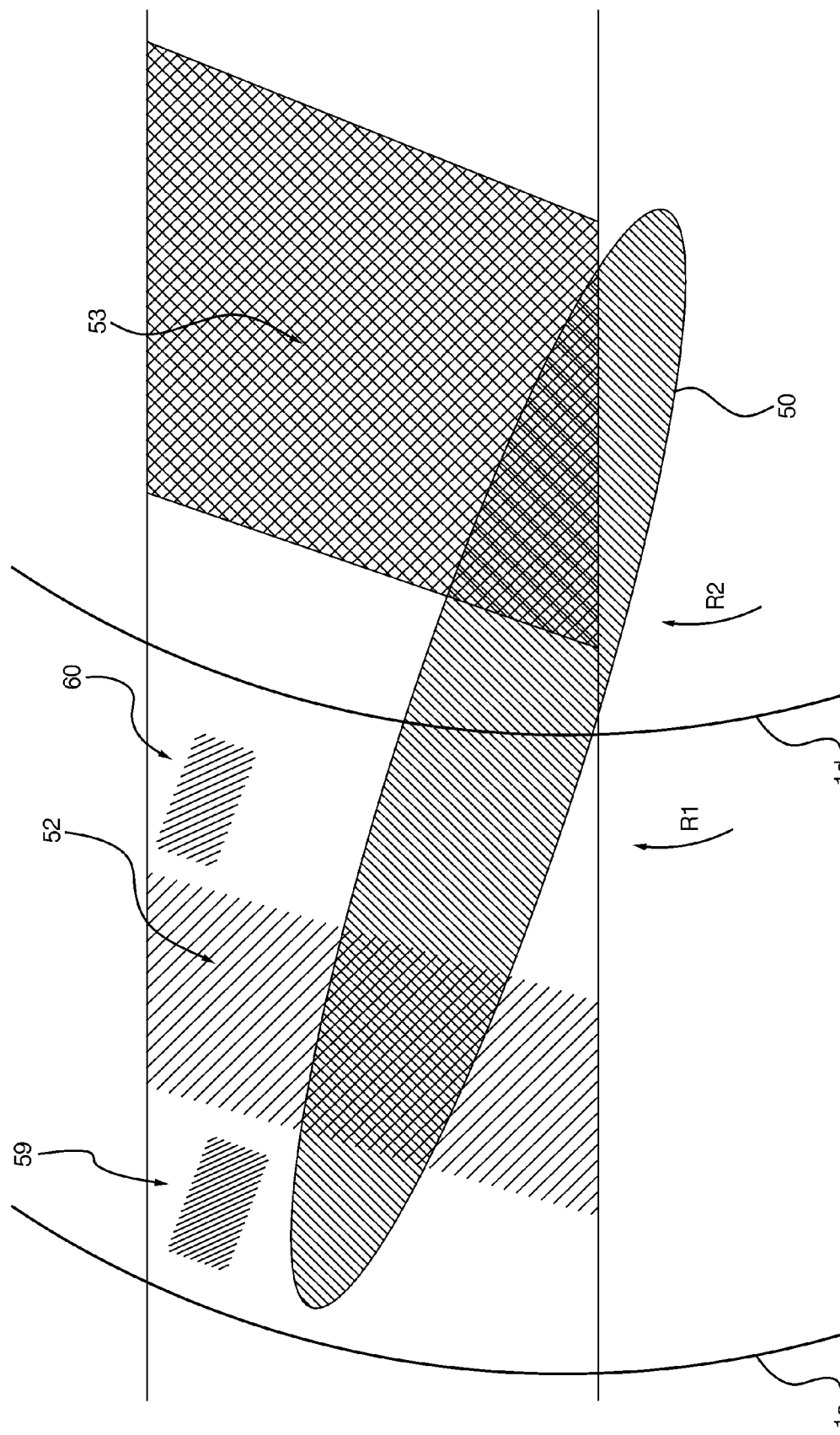
FIG. 19 schematically illustrates details of the measuring device and of the diffractive support according to the invention.

By referring to FIG. 19, an example of conformation of the incident beam (50) is seen for example.

The incident beam (50) thereby covers two distinct diffractive supports (1c, 1d). The diffractive supports (1c, 1d) include diffractive tracks (52, 53) with annular extension, respectively. The second diffractive support (1d) in this case, for example by turning in the direction $R_2$ at a lower velocity than the first diffractive support (1c) rotating in the $R_1$ direction, allows the number of revolutions to be counted for parts in relative rotation. A complementary diffractive track (59) is also provided on the first diffractive support (1c) allowing light synchronization spots to be generated, as well as another complementary diffractive track (60) allowing light calibration spots to be generated for example.

According to FIG. 19, the incident optical beam (50), for example from a laser source, partially covers because of its conformation, the diffractive tracks (52, 53) for a specific position in a specific rotational revolution.

The basic geometrical shapes, constituent of the diffractive components, are recorded for example on computer files and are ready to be manufactured for example by microlithography on a silicon, quartz, or glass wafer.

Other manufacturing methods may also be contemplated without departing from the scope of the present invention.

Figure 20:
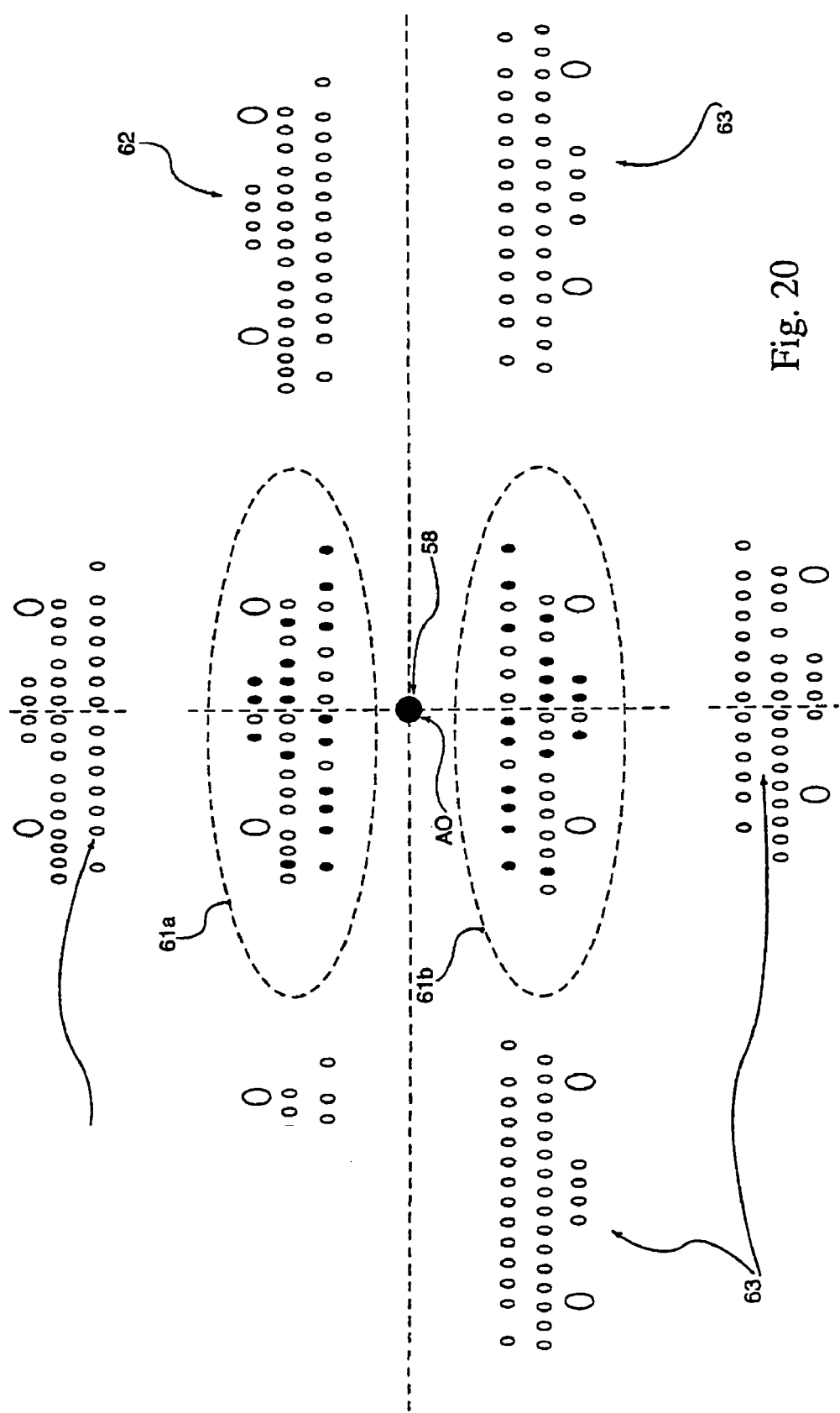
FIG. 20 is an illustration of an exemplary diffracted optical signal, obtained from the method according to the invention.

The diffracted optical signal according to the method in accordance with the invention is illustrated as an example in FIG. 20. The latter shows light spots, the intensity of which is more or less intense, where the diffraction order 0 (58) localized on the optical axis AO, may be identified as well as the first positive diffraction order (61a) and the first negative diffraction order (61b).

Higher positive diffraction orders (62) as well as higher negative diffraction orders (63) are also illustrated, but are not considered in the analysis of the diffracted optical signal.

Figure 21:
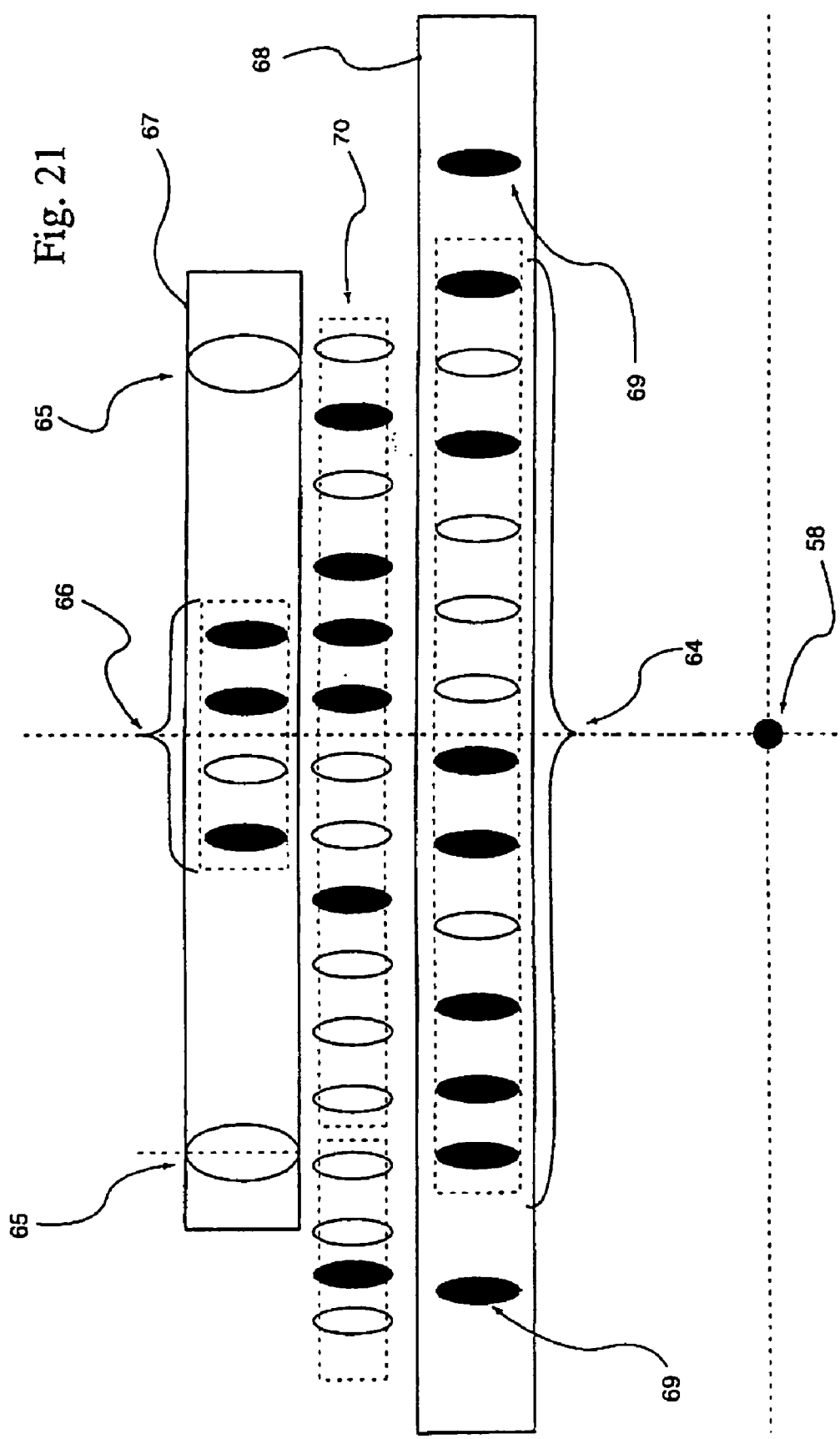
FIG. 21 illustrates an enlarged detail from FIG. 20.

FIG. 21 illustrates a detail of a diffracted optical signal created on the detection means after focusing with the fixed lens (55). With different diffractive tracks, it is thereby possible to create a coded optical signal on the detection means comprising a main coded signal (64) on 12 bits, synchronization signals (65) (light spots), and 4-bit optical counting signals (66) reflecting the number of revolutions accomplished by one of the two components in relative rotation.

These diffracted optical signals are again found in the read-out arrays (67, 68) of the detection means. Optical calibration signals (69) are also found on the detection array (68).

FIG. 21 also shows complementary diffracted optical signals (70), not considered in this example by the detection means, but being used for uniformizing the intensity of the detected light spots.

What is claimed is:

1. A device for measuring the position of a first component in relative motion with respect to a second component, said device comprising:
    at least one diffractive support including
    mounting means carried by a first component in relative motion with respect to a second component, and
    at least one diffractive track;
    at least one fixed light source, emitting at least one light beam onto said at least one diffractive support;
    means for detecting and reading an optical signal obtained by diffraction of the light beam(s) by transmission or reflection from the diffractive support(s), wherein said optical signal contains information indicative of its quality; and
    means for processing optical code resulting from the detected signal allowing the position of the diffractive support(s) relatively to the beam(s) and the reliability of the position information to be determined,
    wherein said diffractive track has means diffracting the light beam emitted by said at least one light source fixed relatively to the second component, and
    wherein said diffractive track contains information indicative of its quality.

2. The measuring device according to claim 1, further comprising means for assessing the reliability of the position information.

3. The measuring device according to claim 1, further comprising means for correcting the position information.

4. The measuring device according to claim 3, wherein the coherent light source is a laser diode.

5. The measuring device according to claim 1, wherein the light beam is sent towards the diffractive support via at least one optical relay component of the lens, prism, diffractive component, reflective component, refractive component type and/or via at least one optical guiding component of the optical fiber or waveguide type.

6. The measuring device according to claim 1, wherein the beam is towards the diffractive support via at least one unit exerting a collimation, focusing or astigmatism function.

7. The measuring device according to claim 1, wherein the light beam is towards the diffractive support via at least one conformation diaphragm.

8. The measuring device according to claim 1, wherein the means for detecting and reading diffracted optical codes consist of photodetectors of the type, array strips or pixel matrices, CCD sensors, photodiodes, or even photoelectric or photovoltaic cells positioned on the trajectory of the rays diffracted by the diffractive support.

9. The measuring device according to claim 8, wherein the photodetectors are positioned so that each diffracted optical structure obtained at the location where a diffracted ray encounters a pixel array, covers at least 3 pixels.

10. The measuring device according to claim 8, wherein the number of pixels between two adjacent spots is set to at least 3 pixels.

11. The measuring device according to claim 1, wherein the light beam is directed at an incidence normal to the diffractive support.

12. The measuring device according to claim 1, wherein the light ray is tilted towards the diffractive support, by an angle between 0° and 17°, relatively to the normal to the diffractive support.

13. The measuring device according to claim 1, further comprising synchronization means for detecting and reading an optical code generated by an individualized diffractive structure when the beam emitted by the light source is centered on said structure.

14. The measuring device according to claim 13, characterized in that the synchronization means include specific photodetectors dedicated to detecting optical structures obtained independently of those forming the code of the position to be measured positioned on at least one diffractive track specifically dedicated to synchronization.

15. The measuring device according to claim 1, wherein the device is configured to facilitate measurement of the rotary movement applied to at least one diffractive support permanently attached to a rotary shaft.

16. The measuring device according to claim 15, comprising two superimposed diffractive rotary disks, one including the measurement of angular positions on one revolution and the other, rotating N times less rapidly, allowing the number of accomplished revolutions to be measured within the limit of N revolutions.

17. The measuring device according to claim 1, wherein a single component forming an optical guide simultaneously acts as a diaphragm, a collimating lens, mirror(s), a protective housing for the laser diode and the photodetectors.

18. A device for determining the position of one of two components in relative motion, with respect to each other, said device comprising:
    a light source attached to one of said components and configured to emit at least one light beam therefrom;

a diffractive support attached to the other component, said diffractive support operative to generate an optical signal indicative of the relative position of said support in response to said at least one light beam impinging thereon, wherein the optical signal is generated by the diffractive support in transmission and/or in reflection, and wherein the optical signal includes information indicative of its quality;

processing means operative to detect and read at least one optical code formed by said signal, which corresponds to a unique position of the diffractive support relative to the beam, and which code includes information indicative of the quality of the signal, said processing means operative to assess the quality of the signal, assign a position to each detected optical code, and generate and transmit an output signal indicative of said position to a user, wherein each detected and read optical code is compared with electronic codes stored in a memory table for determining the position of the diffractive support, and wherein each optical code corresponding to a position of the diffractive support includes at least one optical synchronization structure, the detection of which allowing the triggering of the reading phase of the optical signal integrating the code of a position of the diffractive support relatively to the beam.

* * * * *